(12) United States Patent
Dahlgren et al.

(10) Patent No.: US 7,421,334 B2
(45) Date of Patent: Sep. 2, 2008

(54) CENTRALIZED FACILITY AND INTELLIGENT ON-BOARD VEHICLE PLATFORM FOR COLLECTING, ANALYZING AND DISTRIBUTING INFORMATION RELATING TO TRANSPORTATION INFRASTRUCTURE AND CONDITIONS

(75) Inventors: Darwin Dahlgren, South Minneapolis, MN (US); Nicoline Dahlgren, South Minneapolis, MN (US); Dean Dahlgren, Schaumburg, IL (US); Tah Wei Chao, St. Paul, MN (US); Michael R. Fritsch, Fort Wayne, IN (US); Anthony Kadlec, St. Paul, MN (US); Michael John Pellegrino, St. Paul, MN (US)

(73) Assignee: Zoom Information Systems, Fort Wayne, IN (US)

( * ) Notice: Subject to any disclaimer, the term of this patent is extended or adjusted under 35 U.S.C. 154(b) by 0 days.

(21) Appl. No.: 10/818,432

(22) Filed: Apr. 5, 2004

(65) Prior Publication Data
US 2005/0065711 A1 Mar. 24, 2005

Related U.S. Application Data

(60) Provisional application No. 60/461,040, filed on Apr. 7, 2003.

(51) Int. Cl.
*G08G 1/0962* (2006.01)
*G08G 1/0965* (2006.01)
*G08G 1/0968* (2006.01)

(52) U.S. Cl. .................. 701/117; 701/207; 701/210; 340/989

(58) Field of Classification Search .................. None
See application file for complete search history.

(56) References Cited

U.S. PATENT DOCUMENTS 6,012,012 A * 1/2000 Fleck et al. .................. 701/117
6,064,970 A 5/2000 McMillan et al.
6,166,627 A * 12/2000 Reeley .................. 340/426.25

(Continued)

OTHER PUBLICATIONS

Hoffberg, "Information Collection System for Traffic Mapping, has Mobile Units with Communication Device Communicating Traffic Information with Central Monitoring Station and Prioritized Information with Corresponding Mobile Unit," Derwent, Sep. 14, 2004, 2 Pgs.

*Primary Examiner*—Michael J. Zanelli
(74) *Attorney, Agent, or Firm*—Baker & Daniels LLP

(57) ABSTRACT

An on-board intelligent vehicle system includes a sensor assembly to collect data and a processor to process the data to determine the occurrence of at least one event. The data may be collected from existing standard equipment such as the vehicle communication bus or add-on sensors. The data may be indicative of conditions relating to the vehicle, roadway infrastructure, and roadway utilization, such as vehicle performance, roadway design, roadway conditions, and traffic levels. The detection of an event may signify abnormal, substandard, or unacceptable conditions prevailing in the roadway, vehicle, or traffic. The vehicle transmits an event indicator and correlated vehicle location data to a central facility for further management of the information. The central facility sends communications reflecting event occurrence to various relevant or interested users. The user population can include other vehicle subscribers (e.g., to provide rerouting data based on location-relevant roadway or traffic events), roadway maintenance crews, vehicle manufacturers, and governmental agencies (e.g., transportation authorities, law enforcement, and legislative bodies).

82 Claims, 7 Drawing Sheets

U.S. PATENT DOCUMENTS

| | | |
|---|---|---|
| 6,236,933 B1 | 5/2001 | Lang |
| 6,317,684 B1 | 11/2001 | Roeseler et al. |
| 6,429,812 B1 | 8/2002 | Hoffberg |
| 6,470,272 B2 * | 10/2002 | Cong et al. .................. 701/301 |
| 6,567,035 B1 * | 5/2003 | Elliott .......................... 342/20 |
| 6,587,785 B2 * | 7/2003 | Jijina et al. ................. 701/210 |
| 6,631,322 B1 | 10/2003 | Arthur et al. |
| 6,650,252 B2 * | 11/2003 | Miller, Jr. ................... 340/989 |
| 6,738,697 B2 * | 5/2004 | Breed .......................... 701/29 |
| 6,791,456 B2 * | 9/2004 | Nakayama et al. .......... 340/429 |
| 6,791,472 B1 | 9/2004 | Hoffberg |
| 6,801,837 B2 * | 10/2004 | Carlstedt et al. ............... 701/1 |
| 6,885,874 B2 * | 4/2005 | Grube et al. ................. 455/520 |
| 6,950,022 B2 * | 9/2005 | Breed ......................... 340/552 |
| 7,027,915 B2 * | 4/2006 | Craine ........................ 701/117 |
| 2001/0045891 A1 * | 11/2001 | Nakao et al. ................ 340/426 |
| 2002/0193938 A1 | 12/2002 | DeKock et al. |
| 2004/0138790 A1 | 7/2004 | Kapolka et al. |

* cited by examiner

CENTRALIZED FACILITY AND INTELLIGENT ON-BOARD VEHICLE PLATFORM FOR COLLECTING, ANALYZING AND DISTRIBUTING INFORMATION RELATING TO TRANSPORTATION INFRASTRUCTURE AND CONDITIONS

CROSS-REFERENCE TO RELATED APPLICATIONS

This application claims the benefit of prior filed U.S. Provisional Application No. 60/461,040 entitled "SYSTEM AND METHOD FOR COLLECTING, ANALYZING AND DISTRIBUTING INFORMATION RELATING TO TRANSPORTATION INFRASTRUCTURE AND CONDITIONS" filed Apr. 7, 2003, in the name of Darwin A. Dahlgren, the disclosure of which is incorporated herein by reference thereto.

BACKGROUND OF THE INVENTION

1. Field of the Invention

The present invention relates to vehicle on-board systems, and, more particularly, to a vehicle on-board system adapted to collect and analyze sensor data generated within the vehicle environment to determine event occurrence and to furnish such event information to end users for specialized purposes.

2. Description of the Related Art

There are no current methodologies that are effective in dynamically monitoring roadway assets, roadway conditions, and traffic utilization in a manner that produces meaningful and reliable information useful in enabling users to optimally navigate the roadways, and in providing stewards of the roadway infrastructure the opportunity to determine the best manner to maintain, manage, design, enforce, and improve the roadways.

America has built an infrastructure system to support transportation and commerce that leads the industrialized world. However, the rate of deterioration of this system is increasing dramatically, a dangerous trend that is affecting highway safety, as well as the health of the economy. The repair costs to motorists in the form of roadway-related vehicle repairs and operating costs is significant.

The effects of traffic congestion may be even worse. Passenger and commercial travel on our highways continue to increase dramatically. The average rush hour grew more than 18 minutes between 1997 and 2000. Based on studies conducted in 1997, the Texas Transportation Institute estimates that each year in the United States, 6.7 billion gallons of fuel and 4.3 billion hours of time are wasted due to congestion. The waste due to congestion translates to a total annual cost of $72 billion, $900 for every eligible driver, every year.

Roadway managers and enforcement agencies rely upon expensive periodic roadway studies, surveys and checkpoints, to monitor the roadway condition, capacity, safety, and security. The survey results eventually are used to determine the appropriate corrective or preventative action for maintaining the integrity of the pavement and addressing other roadway issues. These studies, surveys, and checkpoints are quite costly. If surveys just for pavement condition were performed on the entire four million mile U.S. roadway network, this represents a potential expense approaching $8 billion. Once the data is collected it quickly becomes obsolete. Federal, State and local governments simply cannot afford to do a meaningful amount of current surveying and analysis, particularly at this cost. The national infrastructure is too expansive to complete all but a small fraction of the needed asset evaluation.

SUMMARY OF THE INVENTION

According to the present invention there is provided an on-board intelligent vehicle system that includes a sensor assembly to collect data and a processor to process the data to determine the occurrence of at least one event. The data may be collected from existing standard equipment such as the vehicle communication bus or add-on sensors. The data may be indicative of conditions relating to the vehicle, roadway infrastructure, and roadway utilization, such as vehicle performance, roadway design, roadway conditions, Vehicle weights, and traffic levels.

The detection of an event may signify abnormal, substandard, or unacceptable conditions prevailing in the roadway, vehicle, or traffic. The vehicle transmits an event indicator and correlated vehicle location data to a central facility for further management of the information. The central facility sends communications reflecting event occurrence to various relevant or interested users. The user population can include other vehicle subscribers (e.g., to provide rerouting data based on location-relevant roadway or traffic events), roadway maintenance crews, vehicle manufacturers, and governmental agencies (e.g., transportation authorities, law enforcement, and legislative bodies).

In one form, the invention may be directed to on-board vehicle system and method for collecting, analyzing and distributing information relating to transportation infrastructure and conditions.

In another form, the invention may be directed to a centralized facility for providing global management of event collection, analysis and reporting tasks in a distributed multi-vehicle environment.

In another form, the invention may be directed to a multi-vehicle environment employing intelligent vehicle platforms to facilitate the distributed exchange of event-type information between subscriber vehicles concerning roadway condition, capacity and safety.

In another form, the invention may be directed to a system and method employing intelligent vehicle platforms to provide vehicle, roadway and traffic event information to infrastructure maintenance authorities.

In another form, the invention may be directed to a system and method employing intelligent vehicle platforms to provide-vehicle, roadway and traffic event information to vehicle original equipment manufacturers.

In another form, the invention may be directed to a system and method employing intelligent vehicle platforms to provide vehicle, roadway and traffic event information to governmental entities and transportation authorities.

One advantage of the present invention is that real-time data concerning traffic utilization, safety, roadway design, and roadway conditions can be collected and examined to determine the occurrence of events affecting the vehicle environment.

Another advantage of the present invention is that real-time (or virtually real-time or near real-time) event indication information can be processed and evaluated by a central management facility to determine its relevance and/or relationship to the interests of other users and applications.

Another advantage of the invention is that users and applications can receive relevant event occurrence information in real-time (or near real-time) to enable timely and useful response and reaction to the information.

Another advantage of the invention is the formulation of a real-time transportation infrastructure information system configured to provide instantaneous data that is gathered in a passive, non-intrusive, private and virtually cost-free manner.

Another advantage of the invention is that road condition, traffic, hazard, and vehicle data will be collected using public vehicles and provided in real-time to city, county, state, federal and private agencies and even back to the drivers themselves.

Another advantage of the invention is that government and private agencies will use this information to more effectively manage their infrastructure planning, design, maintenance, and conditions dissemination to the traveling public.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
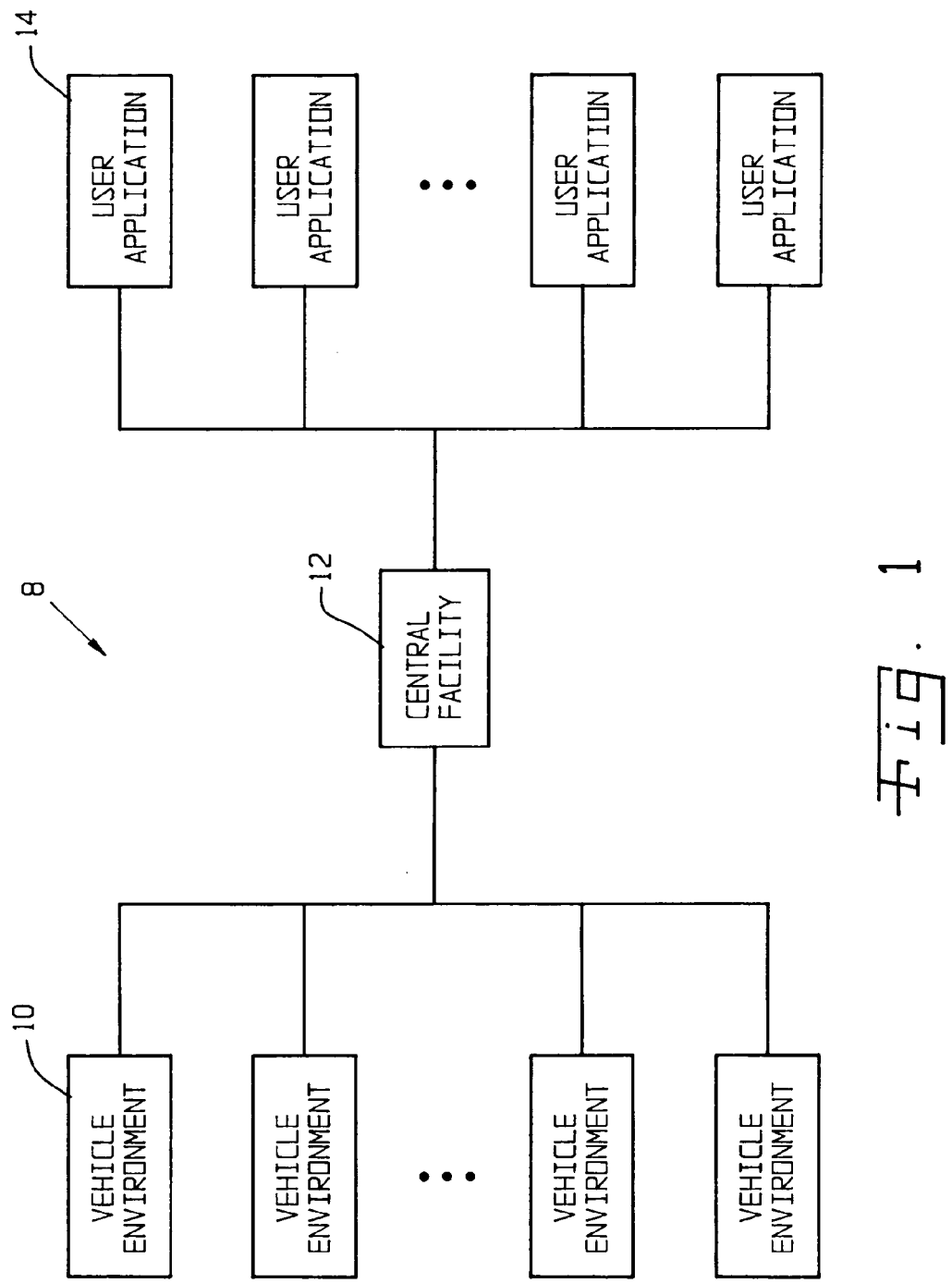
FIG. 1 is a block diagram schematic view of a system integrating a vehicle environment, central facility, and user environment, according to one form of the invention.
Figure 2:
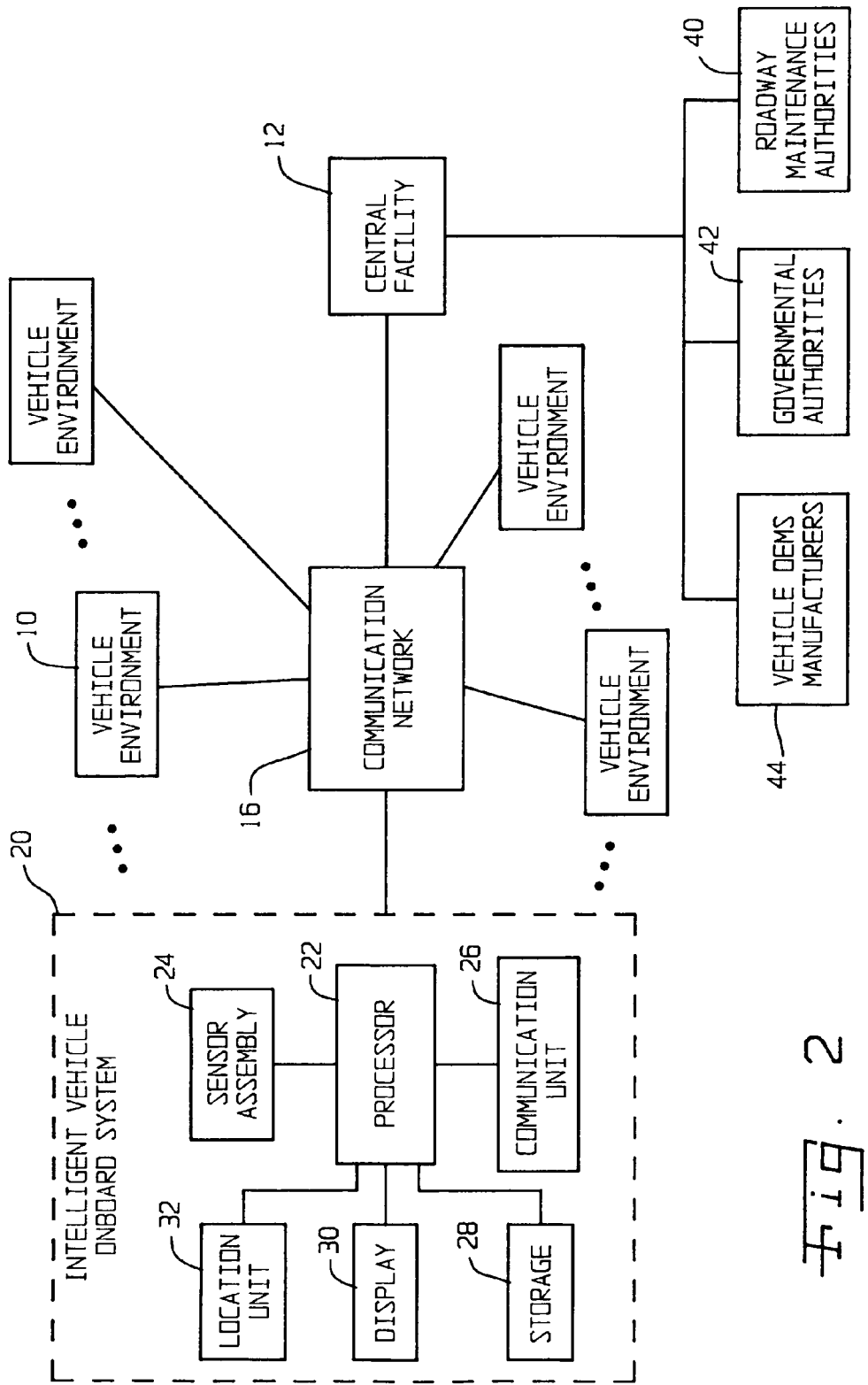
FIG. 2 is a more detailed block diagram schematic view of the system of FIG. 1, according to the invention.

Referring now to the drawings and particularly to FIGS. 1 and 2, there is shown first in FIG. 1 a wide-scale global view of a system 8 integrating a multi-vehicle population having a plurality of individual vehicle environments 10 traveling in a roadway network; a central facility 12; and a user population having a plurality of individual user applications or entities 14, according to one illustrative form of the invention.

Referring to FIG. 2, there is shown a further detailed view of system 8 of FIG. 1. In particular, there is shown in illustrative block diagram view an exemplary vehicle environment 10 constituted as an intelligent vehicle on-board system 20. As shown, central facility 12 is configured for communication with the universe of vehicle environments 10 via a suitable communication network 16.

The illustrated intelligent vehicle on-board system 20 includes, in combination, a processor 22, a sensor assembly 24, a communication unit 26, a storage 28, a display 30, and a location unit 32. In brief, on-board system 20 resides in a vehicle and operates as follows.

The sensor assembly 24 collects data generated in the respective vehicle environment or platform. As discussed further, this data may issue from standard equipment in the vehicle or be retrieved from the existing communication bus in the vehicle or be retrieved from added sensors and equipment. In general, the sensor data may relate to the status, operation, mode, performance, state, or any other measurable characteristic of any device, instrument, part, or component in the vehicle.

The sensor data collected by sensor assembly 24 is processed by processor 22 to determine whether the data indicates or otherwise signifies the occurrence of an event as represented by and correlated to the data. When processor 22 determines that an event has occurred, processor 22 generates an event indicator. For example, an event indicator can be formulated as any type of information or data set that provides some means of indicating the type of detected event. An event indicator may include a classification of the event, a description of the event, and the underlying data that triggered event detection.

Preferably, the event indicator will also include or be associated with a location indicator (generated by location unit 32) that signifies the location of the vehicle at the time that the corresponding event was detected. In this manner, the detected event is correlated with positional information indicating the location of the vehicle where the event occurred. This location data may be provided by any means known to those skilled in the art, such as a GPS unit.

The manner of detecting the occurrence of an event may be undertaken in any of various forms. For example, processor 22 may compare the sensed data to reference or benchmark data to determine if the sensor data falls within or without allowable tolerances, ranges, criteria, requirements, or specifications. If the data falls outside of allowable tolerances, for example, then an event has occurred. The specifications for determining the event occurrence criteria (e.g., range of permissible values) may be stored locally in storage 28. These data specifications may be reprogrammable to enable a user to increase or decrease the margin of variation or deviation for any given sensor parameter or value in the vehicle.

The on-board system 20 generates a communication (such as with processor 22) that transmits detected event information to central facility 12 via communication network 16. For this purpose, a suitable communication unit 26 is provided. The communication of event information will typically include the event indicator and associated location data. Any suitable process or methodology may be used to facilitate the transfer of event information from each vehicle environment to central facility 12. For example, the event information may be transmitted automatically in real-time as the event is detected; periodically at set intervals of time; under specified conditions such as when the queue or backlog of events reaches a certain number; randomly at the discretion of the driver; or in response to polling or other request issued by central facility 12.

A storage 28 may be used to record event information provided by processor 22. A display 30 may be used to display the results of processing operations to the driver, such as the details of an event once it is detected.

The elements of on-board system 20 may be implemented using any means known to those skilled in the art, including, but not limited to, conventional hardware, software, and firmware. For example, processor 22 may be implemented as a computing facility. The communication unit 26 may employ a wireless transceiver.

Taking a broader view of the system shown in FIG. 2, it is apparent during operation that regular streams of event-type information are being uploaded to central facility 12. As discussed further, central facility 12 maybe considered to provide centralized management, control, and dissemination of the event information on a universal, global scale. Among other functionalities, central facility 12 evaluates the event information to determine whether the event information is relevant to any other user in the client population that is served by central facility 12.

For example, as discussed further, if a communication from a vehicle environment includes event information signifying the occurrence of an event related to roadway utilization (e.g., traffic flow or levels), travel safety (e.g., hazards, foreign or alien objects in the roadway), roadway condition (e.g., dangerous surface conditions), or roadway infrastructure/design (e.g., deficient or missing traffic control features), the central facility 12 makes a decision or determination if such event indicators are relevant to any other vehicle in the network. For example, this relevance determination may involve comparing the location of the vehicle associated with the detected event with expected or projected travel routes of other vehicles. A relevance match would exist, for example, if a vehicle is expected to travel towards or proximate the same location where the event was detected. Central facility 12 may then communicate this event information to the vehicle of interest associated with the relevance match.

Referring again to on-board system 20, and specifically sensor assembly 24, the ability of any vehicle environment to effectively ascertain the existence of certain events depends on the quality, integrity and probative value of the raw sensor data, and the development of meaningful algorithms or other analysis tools capable of properly examining, understanding, interpreting, and eventually rendering decisions fully reflecting the outcome of the data analysis, namely, whether the data signifies the occurrence of an event.

Any of various sensor devices may be used in the practice of the invention, including, but not limited to, conventional sensors, instruments, and gauges currently existing as standard equipment on vehicles, such as anti-lock brakes; wipers; traction control systems; headlights; steering angle (from sensors on the steering column, rack-and-pinion assembly); suspension; and additional sensors such as inertial measurement unit (IMU) to measure direction, speed, pitch, yaw and roll of a vehicle; GPS (for vehicle position); Lasers (for detecting roadway anomalies and relation of vehicle to the roadway); and "sniffers" (gas, particulates, spectrum analyzers). Information from these sensors can be interpreted in various ways to arrive at the conclusion that certain events have occurred.

For example, regarding instruments to measure the usage pattern of anti-lock brakes, sensor data reflecting excessive or abrupt use of the ABS system may indicate hazards introduced into the highway such as obstacles, i.e., an event, particularly if other data from the IMU indicates sudden maneuvering of the vehicle simultaneous with ABS activation. Further confirmation of the accuracy of this data interpretation as an obstacle-related event would take place in the central facility if other vehicle environments traveling through the same location upload similar event indicators stemming from comparable ABS and IMU sensor data.

Regarding wipers, sensor data reflecting different periods and types of use (e.g., intermittent, continuous, high-speed continuous) would signify corresponding weather conditions (e.g., light rain, steady rain, and downpour, respectively or light snow, steady snow, and flurries when compared to the vehicles outside temperature reading or from third-party weather reports.)

Regarding the inertial measurement unit (IMU), certain combinations of pitch, yaw and roll measurements will yield different conclusions as to the movement of the vehicle. For example, if the IMU data signifies a maneuver having a contour that does not follow the known contour of the relevant stretch of highway, it can be concluded that the vehicle may be executing an intended excursion around alien or foreign objects or articles in the roadway, particularly if the vehicle quickly resumes its regular course of faithfully following the roadway. Similar event information from other vehicles passing through the same location will likewise verify the existence of a hazard, i.e., a detected event occurrence. The data for the roadway infrastructure, for purposes of comparison with the IMU data, may be stored locally in the vehicle environment and updated as needed, e.g., by downloads from the central facility.

The IMU data may be used to detect a drowsy driver or unintentional vehicle drifting if the IMU data represents random lateral movements.

Regarding traction control systems, data from this system may be used to detect events relating to the frictional interaction between the tires and the roadway. For example, traction data representing excessive slippage beyond a certain threshold may signify that the vehicle has encountered icy conditions on the roadway. Likewise, extended slippage measurements, when not otherwise attributable to weather conditions, may indicate degradation in the tires, e.g., worn treads. Traction data may be obtained from the limited slip differential, for example, to examine the usage history of the traction process.

Regarding headlights, measurements concerning the usage pattern of the headlights or fog lights may signify diminished visibility in a certain area, especially during daylight hours or at other times when for example headlights ordinarily and customarily are not used. For example, the prolonged use of headlights, when correlated to geographical, topographical, or terrain data, may indicate fog in low-lying regions.

Regarding the steering angle, measurements of the angular position of the steering column may indicate overcompensation reflective of the need for the vehicle to undergo realignment. Additionally, irregular patterns in the steering motion, when characterized by a negative or insufficient correlation with the known contours of the highway where such steering measurements were made, may indicate drifting or erratic driving habits needed corrections.

Regarding the suspension, measurement data concerning the suspension may indicate that the vehicle is encountering different geometric features present in the roadway. For example, depending upon the level of strut-shock displacement/return, rigidity, firmness, bounce or spring compression manifesting in the suspension system, the measurements may indicate that a vehicle has passed over a rut, pothole, object or that the vehicle is over weight. An event signifying the presence of a pothole encountered by the vehicle would be supported by concurrent IMU data indicating vertical displacement consistent with the vehicle rapidly entering then exiting a hole at one of its wheels. The combination of IMU data and suspension data may also indicate progressive deterioration in the integrity of the suspension system, especially if the deterioration exhibits a gradual decline, unlike the encounter with a pothole which is characterized by violent shock to the support mechanisms.

Regarding GPS units, the GPS module provides continuous real-time data on the location and position of the vehicle. This position data is preferably retrieved upon the occasion of an affirmative event occurrence so that the vehicle position at the moment the event happened may be correlated to the event indicator.

Regarding sniffer-type devices installed in the vehicle environment, these units maybe employed to detect various substances, such as environmental conditions, carbon dioxide concentrations, carbon monoxide, bio-hazards (e.g., toxic gases such as sarin gas) gases, chemical-biological agents, and certain specified particulates. The devices may also be provided in a form suitable for drug-detection purposes in law enforcement, such as to identify the presence of methamphetamine. In conjunction with these devices, a map-making feature may be provided that involves the construction of a map where each detected event is indexed to its corresponding geographical or municipal location. A spectrum analyzer or gas analyzer may be used to implement these devices, although any other suitable assembly known to those skilled in the art may be utilized.

Once an event has been detected and properly interpreted or classified, there still remains the additional responsibility of determining the applications and uses for such event information so that a meaningful and productive response can be formulated. According to one form of the invention, the task of determining how event information is disseminated to the appropriate end-user or application entity has been assigned to the central facility 12.

Referring again briefly to FIG. 2, central facility 12 is also configured for communication with end-users such as roadway maintenance authorities 40, governmental authorities 42 (e.g., local, state, federal), and vehicle original equipment manufacturers (OEMs) 44. These user entities may be connected to central facility 12 via any suitable communication means, such as communication network 16 or any other conventional facility known to those skilled in the art.

Figure 3:
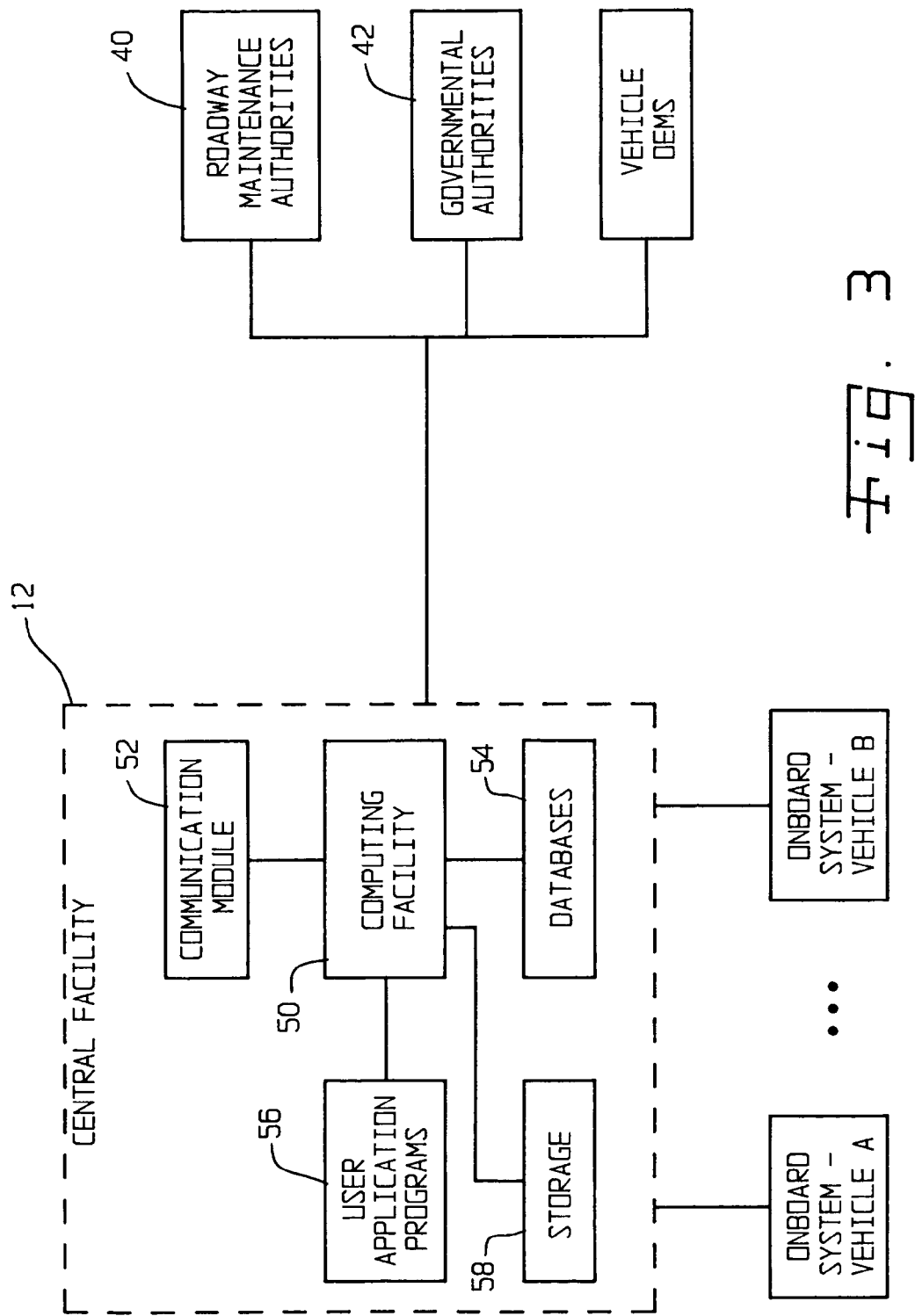
FIG. 3 is a block diagram schematic view of a central facility for use with the systems of FIGS. 1 and 2, according to the invention.

Referring also to FIG. 3, there is shown a block diagram schematic view of central facility 12, according to one form of the invention. The illustrated facility 12 includes, in combination, a computing or processing facility 50, communication module 52, databases 54, user application programs 56, and storage 58.

The computing facility 50 performs the functions of processing the incoming communications from the various vehicle environments, namely, the event information. In particular, the processing tasks will examine the event information to determine its relevance or relationship to the interests of any other user or party within the client or subscriber environment of the overall system. As noted before, for example, an event indicator transmitted from the onboard system of exemplary vehicle A may be of interest to vehicle B based on a comparison of the location indicator correlated to the detected event from vehicle A relative to the planned or expected travel route of vehicle B. This comparison is conducted by central facility 12. If the detected event is found to be relevant to another party, central facility 12 forwards the appropriate communication to the relevant destination (e.g., vehicle B).

The illustrated user application programs 56 are generally illustrative of the profile information or client data needed by central facility 12 to determine whether a certain received event indicator is relevant to the interests, specifications, or requirements of a particular user, client or subscriber. For example, a user may be affiliated with a certain set of event classifications that describe the types of detected events that the user is interested in acquiring on an ongoing basis. For example, if a user desires to receive communications concerning traffic-related items, central facility 12 will forward event notification information to such user once it is determined that a specified incoming event indicator relates to this event category of interest.

In one alternate form, the event determinations are carried out at the central facility 12. In this configuration, the dedicated on-board units of the individual vehicle environments will simply upload the raw sensor data to the central facility 12. Additionally, the event determination tasks may be shared between the central facility 12 and individual vehicle environments where the data originates.

The illustrated storage 58 may be used to store the information received from the various vehicle environments, in addition to the results of the relevance determinations carried out by central facility 12. Databases 54 may store user information and vehicle information for downloading to the individual onboard systems, e.g., software updates, mapping information, and roadway infrastructure updates. The communication module 52 is configured to enable communication with the vehicle environments, users, and any other parties, such as by way of communication network 16 (FIG. 2). Any suitable means known to those skilled in the art may be used to implement the various subsystems of central facility 12, including conventional components.

The following discussion provides various examples of how event information received and processed by central facility 12 may be directed to user groups for further action based thereon.

Regarding vehicle performance applications, central facility 12 may direct performance-related event indicators to vehicle manufacturers and OEMs for purposes of monitoring the reliability of their equipment and monitoring the stability and integrity of vehicle operation. For example, certain such performance-type event data may be used to facilitate the deployment of diagnostics routines to further investigate incipient problems manifested in the event data. Additionally, the event data maybe used to perform prognostics, namely, to make predictions or projections regarding the decline or failure in certain components.

Regarding vehicle operation applications, central facility 12 may direct operation-related event indicators back to the transmitting vehicle in the form of warnings to alert the driver of unsafe driving behavior. For example, event indicators reflecting erratic driving movements may prompt the central facility to issue an alert warning for announcement at the display station of the source vehicle to warn of suspected driver impairment.

Regarding roadway condition applications, the central facility may direct condition-related event indicators to maintenance authorities to facilitate the dispatch of work crews to the affected site. For example, event data indicative of conditions such as roughness, potholes, blowups (ledge in roadway), and cracks may warrant a message to a state department of transportation to send a work crew to an area for repairs or alterations. Other events needing maintenance attention may includes hazards to remove, missing or obscured signs, and signals out.

A transportation authority might also be interested in applications such as ramp metering based on event indicators pertaining to traffic jams at on-ramp signals. In particular, based on the measure of traffic flow (as determined by sensor data reflecting vehicle movement trends correlated to their location at on-ramp junctions), the proper authority may alter or adjust the timing of lights to increase or decrease (as necessary) the flow of incoming vehicles entering the highway from the on-ramp through the control lights. In this manner, an optimal flow of merging traffic is maintained and regulated.

Regarding roadway travel safety applications, the central facility may direct safety-related event data to maintenance crews (e.g., notice of the need for salting due to icy roads or the removal of obstacles) or to vehicles (e.g., weather warning to drivers approaching an area with heavy rain).

Regarding roadway capacity or utilization applications, traffic-related event data may be provided to approaching vehicles or to other parties interested in applications such as trip time analysis and congestion detection.

Regarding roadway design applications, the central facility may report design-related events to the appropriate roadway authorities, as it relates, for example, to design flaws, improper signage, poor navigation of driver on poorly or well designed roadways or intersections, improper curve super-elevation, new driveways, and blind corners from new buildings, all of which may warrant further roadway improvements to safeguard the integrity of the roadway.

Regarding traffic control feature applications, the central facility may report control-related events to the appropriate transportation authorities, as it relates, for example, to hazard warning, alternate route analysis, and ramp metering.

Regarding law enforcement applications, the central facility may direct enforcement-related event indicators to the appropriate authorities, as it relates, for example, to over weight vehicles, running a stop sign, drug sniffing and accident reconstruction.

Regarding homeland security applications, the central facility may direct events such as monitored and timed driving to check points, irregular driving patterns in or around critical facilities, chemical or bio-hazard detection to the appropriate governmental agency.

Regarding weather forecasting applications, the central facility may direct weather-related events to weather bureaus, as it relates, for example, to the identification of areas where it is raining, snowing or icy, wind conditions, and ambient temperatures.

Regarding ecological monitoring applications, the central facility may forward ecology-related events to the appropriate party, as it relates, for example, to air quality detection.

Regarding wireless power monitoring applications, the central facility may receive communications from vehicle environments indicating variations in cell phone strength depending upon location.

This strength data can be used to formulate a map showing the different levels of cellular power as a function of location. This information would be of particular interest to tower operators and cellular service providers.

Generally, the information gathered by the central facility from the vehicle environments may be archived and made available for future data mining purposes as new uses and applications are developed to utilize the event information. For example, as an enhancement to "car-counting", each vehicle passing through a specified counting point can upload the respective vehicle type as part of its communication issuing to the central facility. As a result, it is possible to determine and characterize roadway utilization not only in absolute terms of vehicle volume, but also in terms of how the traffic throughput is distributed among different types of cars. Another example application would be to track the weekly, monthly or yearly activity of commercial as well as other vehicles for routing, compensation, tax, fees, fines, insurance and other analysis by interested parties.

Figure 4A:
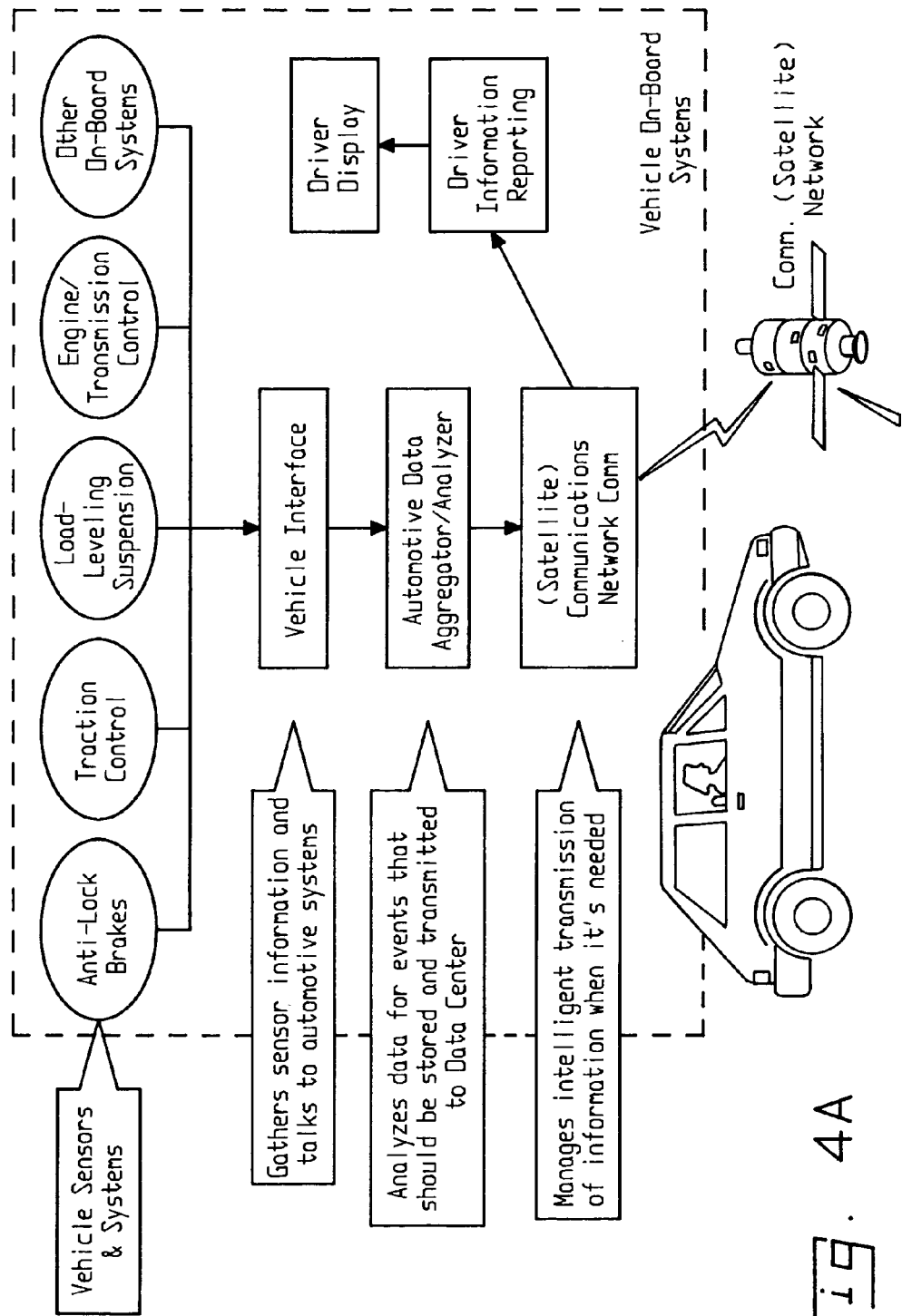
FIG. 4 is a block diagram schematic view of a system, according to another form of the invention.
Figure 4B:
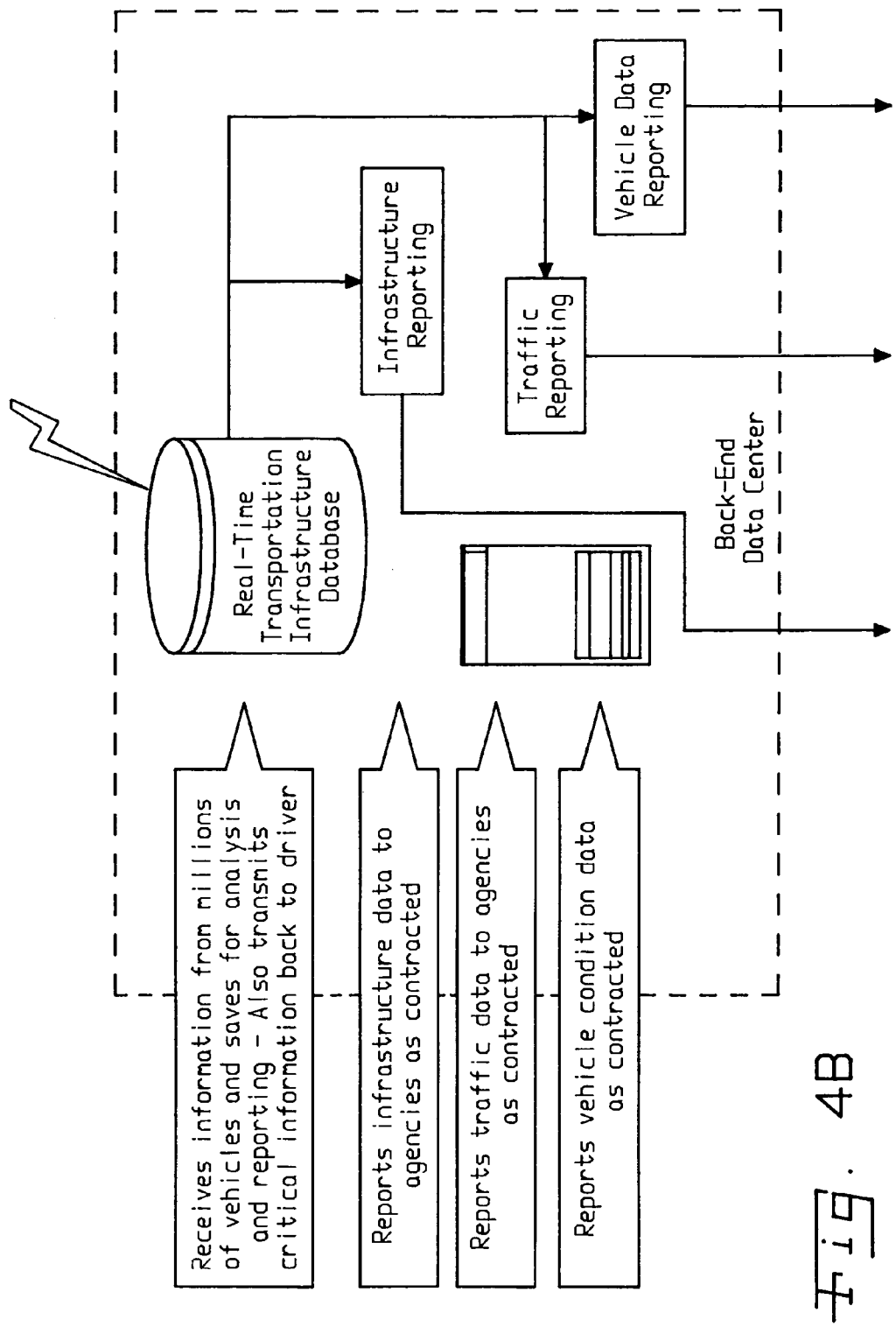
Figure 4C:
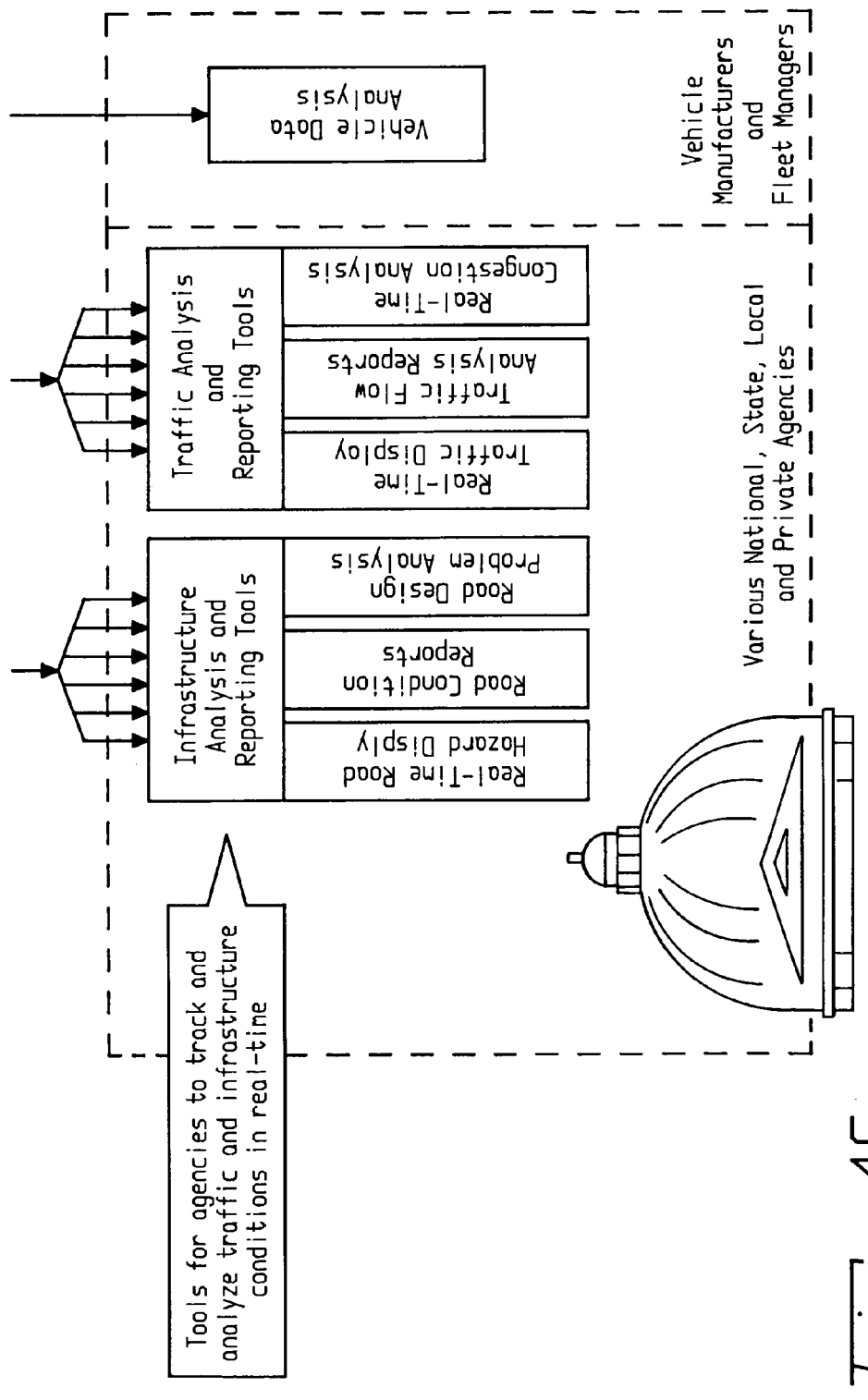
Figure 5:
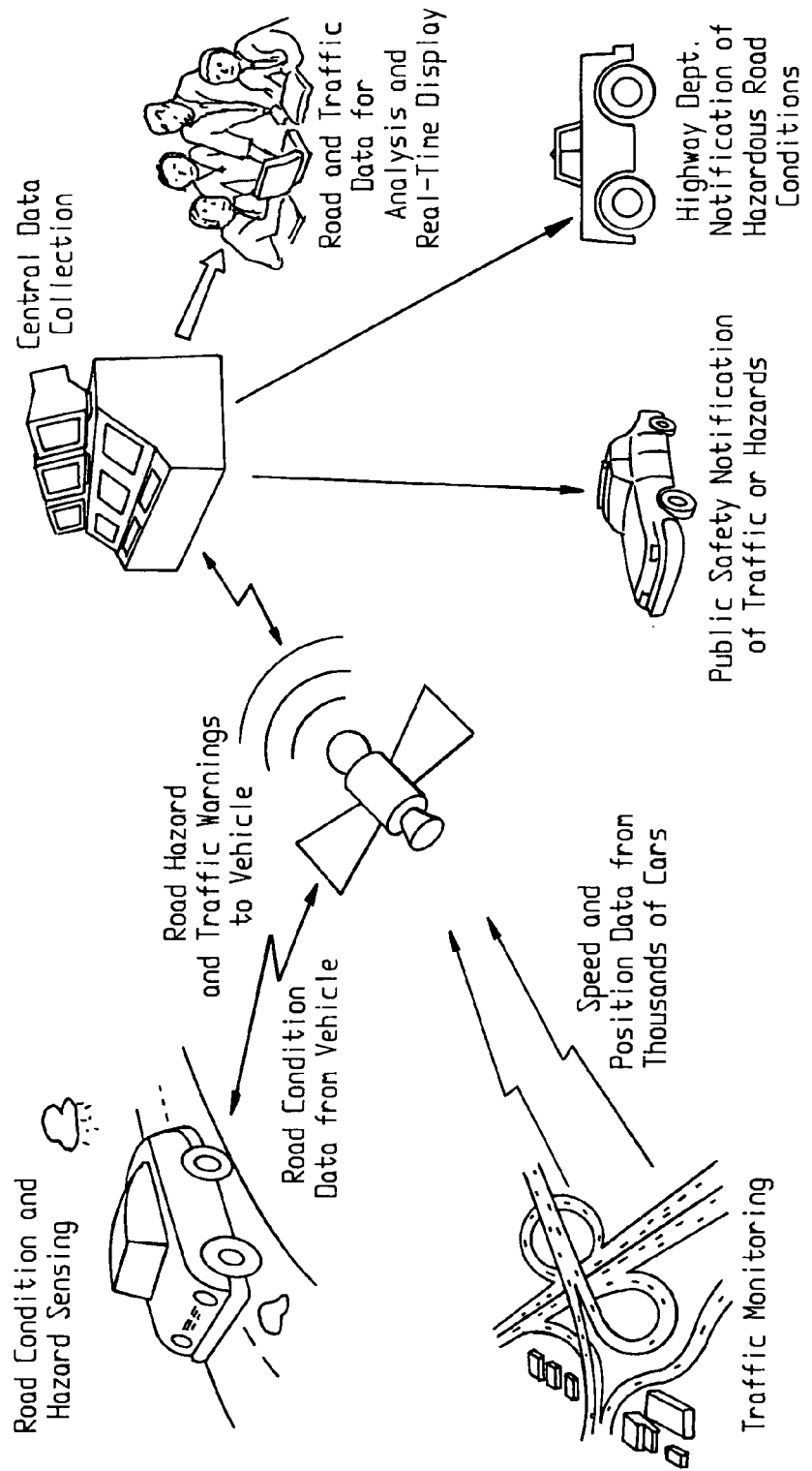
FIG. 5 is a top-level pictorial representation of the interrelationship of system elements depicted in FIG. 4.

Referring now to FIG. 4, there is shown a block diagram view of another system architecture, according to the invention. FIG. 5 is a pictorial representation of the system.

The illustrated system includes a Vehicle On-Board System, a Communications Network (which for example could be satellite, radio (DSRC or frequency hoping systems for example), cellular, Internet (with mobile access from 802.11, 802.16, Bluetooth) or other available method alone or in combination), a Back-End Data Center, and various Agency Data Analysis and Reporting Tools.

The Vehicle On-Board Systems includes subsystems to gather, analyze and transmit vehicle sensor information. The Vehicle Interface electronics gathers sensor information and talks to automotive systems. An array of sensors is required to determine, among other things, vehicle position, orientation, heading, tire pressure, wheel speed, brake status and throttle status. Data from a number of sensors such as wheel speed, vehicle speed, antilock brake status, and throttle position is currently available on standard in-vehicle communications buses.

The Automotive Data Aggregator-Analyzer analyzes the collected data for events that should be stored and transmitted to the Back-End Data Center. The onboard computational subsystem processes data from vehicle sensors and uses this information to log events and conditions for further action. The subsystem uses a fast embedded processor to accommodate the real-time processing needs of complicated math algorithms.

Among other things, the Data Aggregator-Analyzer would compare the information currently detected by the vehicle sensor subsystem to that stored in the DGPS-geospatial database. Depending upon the particular condition of interest (driver departing roadway, rough pavement, roadway ice buildup, etc.) various actions might be taken. Vertical movement may indicate surface conditions such as cracks and roughness index (quality of ride). Vertical, horizontal, pitch and roll displacement during a lane change would indicate rutting. Sensed differences in the wheel speed and the vehicle speed and/or the operation of the ABS would indicate slipping or skidding.

In addition, the traffic flow will also be monitored. A database of roadway location, direction, and expected average speed of flow could be stored in the telematics unit. As a driver travels along a particular segment, the vehicle would calculate average speed and also perform some simple statistical analysis on the speed samples, looking for activities such as unusual stop-and-go conditions or traffic jams. Logic in the Data Aggregator-Analyzer would log unexpected traffic flow as an event, including some information on the conditions, the time, and the coordinates of the event. These events could either be dispatched to the call center immediately in situations where immediate driver feedback would be desired (i.e. advance notice of an upcoming traffic jam) or queued up and sent at a later time when it is more advantageous to do so (i.e. to collect traffic statistics for roadway analysis). The computational subsystem, for example, could include an existing Ford, GM, Daimler/Chrysler, International Truck and Engine Company Telematics hardware, modified for these purposes.

The Communications Network system manages intelligent transmission of information when it is needed. The onboard sensors produce data in real-time, which is subsequently filtered and processed by the computational subsystem. Nevertheless, there may be large amounts of data that need to be relayed between a number of vehicles and the central information processing facility.

To implement some of the features, the communications channel between the vehicle and the central facility will need to support high bandwidth, instantaneous connections with many nodes requiring asynchronous information. In addition, the connection must be virtually ubiquitous, meaning that there are no significant areas where communications cannot be established quickly and reliably with the call center back-end. The communications network supports discrete data transfers bi-directionally, along with voice communications. The network processes data to/from a large number of vehicles simultaneously and autonomously in real-time. Technology to support these requirements is found in multi-mode systems such as a bi-directional satellite communications with additional communication systems such as digital Cellular and or radio communication. The Communication system could operate based on the best available method.

The Back-End Data Center (i.e., central facility) includes subsystems to receive the transmitted infrastructure, vehicle and traffic data from vehicles, store it, analyze it and send data and reports to contracted agencies for further analysis. The ground-based Communications system receives information from millions of vehicles and saves it in a Real-Time Transportation Infrastructure Database. The system also transmits critical information back to drivers as requested.

Infrastructure Reporting software at the Data Center extracts and analyzes the data on road infrastructure. Real-time hazard data can be transmitted back to contracted vehicles. Additionally, data and reports can be made available to various National, State, Local and Private Agencies for further analysis. In the same manner, Traffic Reporting software at the Data Center extracts and analyzes the data on traffic flow and congestion. Real-time traffic data can be transmitted back to contracted vehicles as appropriate. Additionally, data and reports can be made available to various National, State, Local and Private Agencies for further analysis.

Various National, State, Local and Private Agencies, if contracted, can access infrastructure, vehicle and traffic data from the data center. Software tools will enable such agencies to track and analyze traffic and infrastructure conditions in real-time. Infrastructure Analysis and Reporting Tools will contain such functions as: Real-Time Road Hazard Display, Road Condition Reports and Road Design Problem Analysis. Traffic Analysis and Reporting Tools will contain such functions as: Real-Time Traffic Display, Traffic Flow Analysis Reports and Real-Time Congestion Analysis. Vehicle Data Analysis can be accomplished in real-time for vehicle telediagnostics, operation and manufacturer data gathering.

The features of this platform allow participating drivers to receive on-demand: updates of traffic conditions based on their current position and heading, reports of road conditions due to reduced traction, and reports of potentially dangerous intersections and road conditions. Moreover, City/County/State/Federal customers can receive updates of: traffic capacity and congestion, speed and work zone effectiveness, potentially missing signage, and updates of degraded road conditions due to reduced traction and degraded ride quality of the road.

In one form, the interpretive in-vehicle-based telematics units will use the internal vehicle systems BUS data, plus positional systems such as DGPS, laser and inertial sensors to provide real-time data on the pavement and its relation to the vehicle. The unit will record vehicle position, vertical and lateral movements, acceleration, deceleration from DGPS and inertial sensors and along with the vehicle BUS data from the ride stabilization, load leveling, traction control, ABS, and other systems. This information will be translated by the unit into information on roughness, longitudinal profile (smoothness), ride quality (IRI), rutting, potholes, blow-ups, cross slope (%), friction numbers (skid resistance), transverse cracking and other surface anomalies, for example.

The Data Collection system would then send the condition (or other data if additional modules are desired) data via a multi mode wireless system to the Infrastructure Management System (central facility), which will interpret and authenticate data then utilize the communication architecture to distribute the information. This system will model, analyze, quantify and prioritize this information for further real-time distribution to the appropriate database tables, graphics, maps, reports, emails, pagers, phones, etc., of the subscribing agency. Certain parts of this information could be resold to other agencies and private companies and eventually the traveling public customers.

An important aspect of the interpretative or translation functions of the on-board vehicle system concerns the proper characterization of road conditions based on in-vehicle sensor data. In particular, the invention employs algorithms and other procedures adapted to determine from a vehicle, in real-time, the signature of distinct road conditions, traffic conditions, and road hazards based upon multiple in-vehicle sensor inputs. These inputs may include various electromechanical control systems to enhance stability, handling, and performance of the vehicle as well as to improve the safety of drivers and passengers. These systems include anti-lock brake systems (ABS), traction control systems (TCS), air bags, and intelligent stability and handling systems (commercially known as AdvanceTrac™, Traxxar™, Active Handling). The common feature of these systems is that they function based upon the signals collected from a network of sensors that detect the kinematics of the vehicle in motion, road conditions, and inputs from the driver.

For example, repetitive occurrence of ABS/TCS activation from multiple vehicles in proximity of a certain location may be indicative of a slippery road surface.

A typical methodology, for example, may include defining traffic conditions and road hazards that could be classified and identified by existing devices and systems; and developing mapping algorithms that analyze the multiple in-vehicle sensor inputs and identify a classification.

Additionally, the invention may employ algorithms directed to predictive analysis and reporting of traffic flow and road hazards based on integrated input. This feature is provided to determine, in real time, the signature of a reportable traffic condition or distinct road hazard based upon the multiple sensor inputs. A typical methodology, for example, may include identification of significant traffic or hazardous roadway conditions; formulation of predictive traffic models based on sensor data; and providing a system to communicate conditions to motorist.

Additionally, the invention may employ algorithms directed to predictive analyses and reporting of road conditions based on integrated input. This feature is provided to determine from a vehicle, in real time, the signature of roadway conditions based upon multiple sensor inputs. A typical methodology, for example, may include formulating algorithms that correlate sensor data with standard road condition indices; and integration to a GIS mapping system that correlates with the real time information.

Regarding the communications infrastructure, it should be understood that the invention contemplates car-to-call center communications, car-to-mobile computer, call center-to-mobile computer and car-to-car communications.

As disclosed herein, the invention may be considered to encompass a transportation information system and method that integrates proven data collection and back-end internet-based infrastructure management systems with vehicle information systems, mobile computing and telematics knowledge. The system gathers and uses existing information from the vehicle bus and communication technologies. However, as vehicle systems are equipped with additional sensor capabilities, and communication technology improves the value of the information from the system will grow dramatically.

The transportation information system provides a means by which passenger cars and other vehicles can collect roadway surface condition and performance data and report the information to a centralized location via existing communications channels. Once reported, the data is analyzed and disseminated, such as to fee-paying customers. Examples of data that may be acquired and analyzed include information that is correlated to changing ride quality, surface lane rutting, and surface friction quality.

The transportation information system takes advantage of the great number of passenger and fleet vehicle miles driven annually over millions of miles of roads. This vehicle pool will be used for national system data collection and reporting. Local fleet vehicles and government vehicles such as public works vehicles, inspection vehicles, school buses, police and highway patrol cars, garbage trucks, delivery vehicles and other vehicles that constantly travel a city's streets can be used for local data collection and reporting systems. Equipping these vehicles with additional sensing devices, processing and storage systems, interpretive software and wireless communications systems can provide real-time data that is gathered in a passive, non-intrusive, private and virtually cost-free manner. The transportation information system envisions collecting sensed data from actual vehicles in ordinary use. The system interpretive software would evaluate the sensed data. Information from the system would be disseminated using any telematics and Internet capabilities, facilities, and protocols, such as conventional ones.

As exemplary applications, consider the experience of vibrations and perhaps the aggravation as one drives over a bump, a pothole, a rut or other surface distress. The on-board sensors on the vehicle bus detect these same movements, transmit that data to a processing center where it is interpreted into roadway condition information. Automatically this information is communicated to the responsible government agency, and in a short time the roadway is repaired.

Additionally, there is the ability to be informed of a traffic jam as one approaches it, based on the progress of other vehicles ahead of you. Since a user may have pre-loaded a final destination, an alternate route is planned and timed so that one can make an informed decision whether to take the new route or stay on course.

Additionally, there is the benefit of knowing in advance that an intersection one is approaching has had a stop sign knocked down. In addition to being important to approaching drivers, this condition is also important to the government agency responsible for maintaining signs.

In other forms, it may be considered that the invention encompasses system and method directed to the collection, interpretation and dissemination of data pertinent to road surface condition, safety, liability and traffic usage. The system and method further involve the mining of the data for OEM design, maintenance, marketing and sales purposes. Specifically, data relating to these areas will be gathered, interpreted, stored and disseminated: ride, fatigue cracking, weather- and construction-related cracks, rutting, crown, signage and signal anomalies, traffic jams, construction, traffic congestion, presence of obstacles on the road, and miscellaneous other condition items. In one illustrative form, the data collection uses GPS or DGPS and/or IMU that coordinates and monitors the start/stop/slow-down, swerve type events that can be detected from the existing vehicle bus and telematics equipment.

In another form, the invention may be considered to encompass a system architecture that includes an in-vehicle telematics unit with the ability to process and filter data, driver interface, a communications network based on existing and future cellular, radio and wide-area network communications, and a back-end call center/data processing hub. The data collection will be derived from the existing vehicle electronics architecture.

An onboard computational unit will gather data relating, for example, to vehicle speed, position relative to the roadway, GPS coordinates, status of antilock brakes, and tuned suspension, and transmit it via in-vehicle telematics communication devices to a central information processing facility. The central information processing center will aggregate the data for analysis and interpretation. Depending upon the type of services provided and the content of the data received, status and information may be transferred back to individual vehicles and/or to the responsible agencies from the central information processing facility where it will be stored and maintained. Condition information will be used to reevaluate the network rating, work orders will be prepared and monitored as required and incident management controls and actions will be established.

In addition to off-board information processing, on-board analysis will also be available. Some infrastructure data will be stored within the vehicle-processing unit to enable computation of safety incidents or out-of-bounds events. Based on the amount of stored knowledge at the vehicle level certain feedback will be immediately communicated to the driver. For example, using map database information and current position data, a driver going down the wrong way on a one-way street can be alerted immediately. This event can simultaneously be logged and sent to the call center to be added to other like incidents to determine the magnitude of the problem and possible causal factors, i.e. improper signage. As with any similar system, there will be a number of verification computations to insure information integrity and accuracy.

Regarding further details of the telematics unit, the telematics units incorporate the algorithms needed for capturing, storing, analyzing and reporting events. The call center or central facility then extracts the events from the telematic communications. The telematics units also will be able to collect traffic flow information and correlate it to fixed geographic coordinates (roadways), and report the information to the call center. In addition, the units would receive traffic flow information and provide it to the driver. The captured events would be stored in the call center for later processing and data mining by internal and external parties.

An enhanced data collection capability is also possible. For example, the use of a low-cost IMU to monitor road surface roughness, obstacles and obstacle avoidance, road ice/ABS activation, and other inertially-detectable conditions provides the enhanced capability. These additional events would be sent to the call center, and enhanced processing would provide for additional levels of traffic information to be sent to subscribers. In addition, this information would be highly useful to outside parties interested in monitoring current road conditions (i.e. salt crews or law enforcement). With full data collection capabilities, an enhanced IMU/GPS navigation system could monitor very dynamic roadway conditions (e.g. driving through a controlled intersection due to missing stop sign) as well as more subtle driving patterns (e.g. obstacle in the roadway causing a number of lane changes/departures)

In yet another form, the invention may be considered to encompass a data collection/dissemination functionality that includes a vehicle bus and sensor subsystem, a vehicle computational subsystem, a communications network, a back-end information processing subsystem, and a driver interface.

The communications network supports discrete data transfers bi-directionally, along with voice communications. The network processes data to/from a large number of vehicles simultaneously and autonomously in real-time. The size and frequency of transactions is kept to the minimum necessary for system functionality so network traffic planning is performed in determining how well existing communications networks will perform, and whether enhancements will be needed to provide additional value to the users of the system. The back end configuration (central facility) has capabilities for logging road conditions and other vehicle events.

Vehicle Bus and Sensor Subsystem

An array of sensors is required to determine, among other things, vehicle position, orientation, heading, tire pressure, wheel speed, brake status and throttle status. Data from some sensors such as wheel speed, vehicle speed, antilock brake status, and throttle position is currently available on standard in-vehicle communications buses such as J1850 or CAN. This data can be collected by the on-board telematics unit from the vehicle network(s).

Position information relative to the roadway and other physical features is also important. Vehicle data correlated to physical location is a key element in determining when events of significance should be logged and communicated. A Differential GPS unit provides highly accurate location information at a periodic rate. However, between DGPS updates, interpolation of the position and trajectory of the vehicle is necessary to determine such events as roadway departure. To accomplish this interpolation, the sensor subsystem includes an Inertial Measurement Unit (IMU). The IMU provides velocity and acceleration information along and about the pitch, roll, and yaw axes. The IMU also communicates via a vehicle bus to the computational subsystem in the vehicle.

One typical configuration includes the existing vehicle sensors, the existing vehicle bus, existing telematics in-vehicle hardware that incorporates standard GPS, and a low-resolution IMU that is constructed using micro-machined accelerometer and material layered technology. This configuration has sufficient accuracy to note the location where vehicle events occur, such as ABS activation or encountering pavement damage. Optionally, correlation of the location coordinates to actual infrastructure elements would not be performed in the vehicle. Rather, in this configuration, events and conditions would either be stored for later retrieval, or could be sent immediately to the call center via cellular data channel.

The call center would process this data and correlate it to map information.

Computational Subsystem

The onboard computational subsystem processes data from vehicle sensors and uses this information to log events and conditions for further action. The subsystem uses, for example, a fast embedded processor (such as the Motorola MGT5100) to accommodate the real-time processing needs of complicated math algorithms.

The computational subsystem stores a geospatial database containing feature data and latitude/longitude coordinates. The geospatial database will contain attribute and condition information concerning the roadway, right-of-way and other items. Information such as pavement surface condition, pavement type, obstructions, signs, signal, road geometry, and shoulder drop-off, would be collected initially into a national mapping database and supplemented (or derived) from the equipped vehicles over time.

Due to the large amount of data needed for nationwide coverage at a resolution useful for this system, it is probably unfeasible to expect that a geospatial database covering the entire roadway infrastructure could be carried on-board each vehicle. Hence, there must be a way to periodically refresh this data depending upon the vehicle's current location and expected route. At some point, the vehicle will have to load new infrastructure data into the on-board database. This data might be loaded via fixed media (such as DVD or flash memory), or it might be transmitted to the vehicle via a communications network.

Among other things, the computational system would compare the information currently detected by the vehicle sensor subsystem to that stored in the DGPS/geospatial database. Depending upon the particular condition of interest (driver departing roadway, rough pavement, roadway ice buildup, etc.) various actions might be taken. Vertical movement may indicate surface conditions such as cracks and roughness index (quality of ride). Vertical displacement during a lane change would indicate rutting. Sensed differences in the wheel speed and the vehicle speed and/or the operation of the ABS would indicate slipping or skidding. While the illustrations are not comprehensive, they do indicate the types of events that could be detected.

In addition, the tracking of traffic flow could also be monitored. A database of roadway location, direction, and expected average speed of flow could be stored in the telematics unit. As a driver travels along a particular segment, the vehicle would calculate average speed and also perform some simple statistical analysis on the speed samples, looking for activities such as unusual stop-and-go conditions or traffic jams. Logic in the telematics unit would log unexpected traffic flow as an event, including some information on the conditions, the time, and the coordinates of the event. These events could either be dispatched to the call center immediately in situations where immediate driver feedback would be desired (i.e. advance notice of an upcoming traffic jam) or queued up and sent at a later time when it is more advantageous to do so (i.e. to collect traffic statistics for roadway analysis). Using an event-based mechanism, rather than a continuous stream of telemetry data from a vehicle, and transmission at non peak hours or when vehicle is parked near transmission stations reduces the bandwidth demand on the communications channel. The on-board processing capability of the telematics unit is the enabler for this type of data collection.

In one exemplary form, the computational subsystem may include an existing OnStar or other provider in-vehicle hardware, modified to include a DSP processor that could process data from the low-cost IMU mentioned previously. If the vehicle already has a ride-control system installed (such as those on certain Cadillac models) that can deliver information on roadway conditions (pavement roughness), then the roadway condition logging may be possible even without the IMU and DSP subsystem. Obviously, as more computational power is included in the system, better filtered and more accurate data can be obtained. Map data could be stored in a removable memory device (PCMCIA, Compact Flash or other storage device) that is loaded and configured at a desktop PC or via some other information appliance prior to driving.

Communications Subsystem

The onboard sensors produce data in real-time, which is subsequently filtered and processed by the computational subsystem. Nevertheless, there may be large amounts of data that need to be relayed between a number of vehicles and the central information processing facility. To implement some of the features anticipated, the communications channel between the vehicle and the central facility should support high bandwidth, instantaneous connections with many nodes requiring asynchronous information. In addition, the connection should be virtually ubiquitous, meaning that there are no significant areas where communications cannot be established quickly and reliably with the call center back-end.

Several alternative approaches may be considered to provide this ubiquitous high-speed communications link. Current first and second-generation cellular communications provide broad coverage but low bandwidth when the vehicle is on the road. This capability would be sufficient for identifying discrete events and small packets of associated data. It is also possible to employ third-generation cellular, radio, satellite radio, ultra-wideband (UWB) radio, short-range wireless communications and wide area networks and 802.11 or other technology.

In one alternate computing configuration, the computational requirements may be distributed between the vehicle telematics unit and the back-end call center. Pre-determined logic will be programmed into the telematics unit to process sensor data, determine the vehicle location, and correlate it to previously stored on-board databases. This correlation logic will create events of significance that will be logged and sent to the call-center at an appropriate time. The unit will also accept incoming data messages and files from the call center and provide appropriate feedback to the driver and the vehicle Computational Subsystem.

For example, suppose a driver is currently traveling eastbound on I-10 in the Dallas metropolitan area during evening rush hour. The vehicle GPS is used to locate the appropriate road segment in the on-board database. The database, previously loaded with roadway information for this geographic region, indicates that the expected average speed on this segment should be 60 mph between the hours of midnight to 6 AM, 45 mph from 6 AM to 10 AM, 55 mph from 10 AM to 4 PM, 45 mph from 4 PM to 7 PM, and 60 mph from 7 PM to midnight. The vehicle speed sensor (or alternately, the GPS) is collecting data every 0.5 seconds and calculates a running average speed using the last 100 samples. If this average falls below a certain threshold under the expected speed (say 25%), the telematics unit logs this event.

It can then do any of several things. (1) Immediately send this event data to the call center via modem on the cellular channel. (2) Wait for a poll from the call center, compress the data, and send it to the call center via Microburst. (3) Compress the data and send it immediately via CDPD, SMS, or similar mechanism. (4) Continue to log events and download the entire log at some future time.

Conversely, the driver may want to be notified if the road ahead becomes congested so that an alternate route can be taken. The driver uses the telematics unit to select a route (or predetermines it before entering the vehicle) and sends this route data to the call center, giving the approximate time that the route will be traversed. If the call center, as it is collecting real-time events from the other drivers, determines that there is congestion on this driver's route, it sends traffic information to the driver's telematics unit, and could potentially suggest an alternate route at the same time.

One option regarding the bandwidth requirements can be found by supplementing the ubiquitous communications channel with a second channel that is more sporadic in nature. High-bandwidth, short-range wireless communications is currently in use in many businesses today. If this technology were deployed at discrete locations (such as gas stations, homes & businesses, major intersections, or public rest areas, points along a freeway), large quantities of data could be quickly exchanged between the vehicle and the back end call center.

Another complementary technology may include satellite radio. Digital satellite radio, such as that provided by XM and Sirius, can transmit very high bandwidth digital data from a remote source to the vehicle. In a manner similar to existing DirectPC technology or ADSL, an imbalanced data channel could be established between the vehicle and the back end call center. Requests and data from the vehicle could be sent via a slower communications like (cellular), while content (like map updates or DGPS corrections) and other information could be sent from the call center to the vehicle via the "digital radio". This broadcast channel would provide coverage over virtually all of the US to distribute information to the vehicle.

Another alternative technology and infrastructure is found in bi-directional satellite communications, such as that provided by Orbcomm. Coverage is nearly universal in North America, but like existing cellular communications the bandwidth capability is limited. However, for immediate status reporting of events, such a channel could be valuable. A further optional technology is ultra-wideband (UWB) radio. This technology offers both communications and other capabilities at very low power and over long distances. In areas where vehicle-to-infrastructure communications is unavailable or coverage is spotty, UWB might fill the gap and allow channels to be maintained over multi-mile ranges, perhaps even in a peer-to-peer mode between vehicles. Additionally, third-generation cellular (3G) and future generation cellular may provide a robust implementation.

A significant use of the communication system will be to enable drivers and vehicles to instantly communicate with the agency managers responsible for the infrastructure. Additional drivers may be able to communicate via the vehicle, or handheld device that communicates with the vehicle and to the call center. It is envisioned that the driver subscribing setup information accessed to send or receive a prototypical message to agency managers concerning conditions encountered and possible options to deal with the encounter condition.

Communications to the central facility could be initiated in any of various ways, e.g., automatically, upon polling, at specified intervals, and in response to certain conditions. For example, communications would be triggered by the on-board hardware in much the same way as an airbag deployment triggers a call to the call center. If the data latency is not a concern (to download large amounts of logged data, for instance), the call could be placed at some opportune time when the network traffic is lower and the vehicle is not collecting data. The detected event information would be sent to the regional processing/storage center for further comparisons and storage, i.e., to determine its relevance and/or relationship to the interests of other users and applications.

One of the notable features of the dedicated on-board vehicle system involves the ability at the point of data collection (i.e., vehicle) to analyze the collected data in real-time as it is being acquired during use and transit of the vehicle, with a view towards determining whether the data signifies the occurrence of a specified event. As used herein, an event may refer, without limitation, to any real, constructed, or artificial condition, circumstance or situation encountered by the vehicle. Typically, an event will occur when the monitored data satisfies certain prescribed threshold, benchmark, or reference criteria. For example, a specified event may occur when a comparison of the sensed data to reference data yields a result (e.g., differential comparison value) that falls within or exceeds a certain range or tolerance.

In different forms, the task for executing the event determination process may be carried out in different forms. For example, an event detection process may employ any suitable algorithmic-type, logic-based, or rule-based functionality that performs data analysis, evaluation, processing, and/or interpretation. The advantage of employing such an event detection process is that it translates the otherwise raw sensor data into an interpretative outcome enabling one to understand the various driving dynamics, behaviors, mechanisms, and phenomenons that are taking place interactively with one another and occurring rapidly during vehicle travel.

The following discussion details various types of information that may be collected and how such information may be analyzed to determine whether an event has occurred.

Data may be collected from the existing internal vehicle system BUS, in addition to information from positional systems such as Differential corrected GPS (DGPS) and inertial sensors.

One set of operational features may facilitate the following functionalities: participating drivers can receive (1) on-demand updates of traffic conditions based on their current position and heading; (2) on-demand reports of road conditions due to reduced traction; participating drivers can receive on-demand reports of ride quality of the road; (3) on-demand reports of potentially dangerous intersections and road conditions; and (4) alerts to points of interest as they pass them. Several individual vehicle components are discussed below.

Anti-lock brake system: Allows the system to indirectly determine that a vehicle has encountered a road condition with degraded stopping ability. This feature coupled with GPS coordinates and intelligent mapping software will allow the determination of degraded areas for stopping and alert other interested and/or responsible parties and warn drivers in the vicinity.

Traction control system: Allows the system to indirectly determine that a vehicle has encountered a road condition typically at an intersection with degraded vehicle motion starting ability.

This feature coupled with GPS coordinates and intelligent mapping software will allow the determination of degraded areas for vehicle starting and alert other interested and/or responsible parties and warn drivers in the vicinity.

Load-leveling suspension system: Allows the system to directly determine that a vehicle has encountered a rough road condition.

This feature coupled with GPS or DGPS coordinates and intelligent mapping software will allow the determination of rough road surface conditions and alert other interested and/or responsible parties and warn drivers in the vicinity.

Engine/Transmission control system: Allows the system to determine a whole host of potential road-condition situations including the following:

(1) By monitoring the vehicle speed and cross referencing that with highly-detailed on-board mapping software, the system can determine if the vehicle has been traveling beneath the posted speed limit and alert other interested and/or responsible parties and warn drivers in the vicinity of a potential congestion on the road or road blockage.

(2) By monitoring the vehicle speed and cross referencing that with highly-detailed on-board mapping software and the vehicle location from GPS or DGPS coordinates, the system can alert other interested and/or responsible parties and warn drivers in the vicinity of potential difficult road conditions such as complex intersections and one-way roads.

(3) By monitoring the vehicle speed and cross referencing that with highly-detailed on-board mapping software and the vehicle location from GPS or DGPS coordinates, the system can inform the vehicle occupants of predefined destinations and points of interest (e.g., scenic bluff, monument) and alert other interested parties such as restaurants, amusement parks, or other commercial businesses of oncoming vehicles in the vicinity and offer drivers special deals and incentives for stopping at their establishment along the way.

This feature could be something that a commercial business or public entity could receive as a subscription and/or could be utilized in conjunction with the commercial business or public entity providing a communication point for transmission of vehicle data to the central facility.

Each of the vehicle features above is monitored actively by on-board vehicle software. In one form, when an event is detected, it is added to a queue of events that are sent to the data center. Then, on a periodic basis, for example, these events are relayed to the central data center for processing and dissemination to other vehicles. These updates to the data center consist of less than 60 seconds of bandwidth at 9600 baud, for example. When all the vehicles are pooled together in a given market, the sheer number of vehicles will fill in the gaps of time and location created by updating only certain data less frequently (e.g., every hour) to the data center.

The following is one illustration of the above system operation. A first driver is driving down a twisty, mountain road on a winter evening approaching a curve when the road becomes slippery due to ice. The first driver hits the brakes to slow down to negotiate the curve. The ABS system activates, thereby slowing the vehicle enough to make the curve safely. At the same time, the telematics system of the vehicle notifies the central call center that the anti-lock brake system has activated. Noting the position of the first vehicle via the on-board GPS system, the call-center's software is able to determine the exact location of the first vehicle, and where the icy conditions exist. The call-center software immediately creates a traffic incident that becomes available for broadcast to other drivers in the area and to local agencies responsible for maintaining acceptable road conditions. Beneficially, if a second driver traveling behind driver one is moving at a speed that is too fast for the upcoming icy conditions, an alert may be issued to the second driver. In particular, the second driver receives the broadcast warning of icy road conditions ahead as the system detects that the second vehicle is approaching the area where first driver engaged the antilock brakes.

Another alternative would involve the second driver activating the telematics service button to get the latest road conditions in the surrounding area. The telematics system automatically recognizes the second vehicle location (e.g., via GPS) and searches the advisory database for all warnings on the road the second driver is traveling on. At that point, the second driver hears through the car stereo speakers or dashboard/windshield warning system that there are slick conditions ahead, allowing the driver advance notice to slow down or take a different route to successfully navigate past the icy road conditions.

Another set of operational features may facilitate the following functionalities: City/County/State/federal customers can receive (1) updates of traffic capacity and congestion; (2) updates of speed zone effectiveness; (3) updates of potentially poor or missing signage; (4) updates of degraded road conditions due to reduced traction; (5) updates of degraded ride quality of the road; and (6) updates of potentially dangerous intersections and road conditions. Additionally, OEMs can retrieve statistical data useful for failure analysis and warranty claims prediction. Several individual vehicle components are discussed below.

Anti-lock brake system: Allows the system to indirectly determine that a vehicle has encountered a road condition with degraded stopping ability. This feature coupled with GPS coordinates and intelligent mapping software will allow the determination of degraded areas for stopping and send a notification to the street department to warn of the condition for inspection and/or corrective action.

Traction control system: Allows the system to indirectly determine that a vehicle has encountered a road condition typically at an intersection with degraded vehicle motion starting ability. This feature coupled with GPS coordinates and intelligent mapping software will allow the determination of degraded areas for vehicle starting and send a notification to the street department to warn of the condition for inspection and/or corrective action.

Load-leveling suspension system: Allows the system to directly determine that a vehicle has encountered a rough road condition. This feature coupled with GPS or DGPS coordinates and intelligent mapping software will allow the determination of rough road surface and send a notification to the street department to warn of the condition for inspection and/or corrective action.

Engine/Transmission control system: Allows the system to determine a whole host of potential road-condition situations including the following:

(1) By monitoring the vehicle speed and cross referencing that with highly-detailed on-board mapping software, the system can determine if the vehicle has been traveling beneath the posted speed limit and provide statistical data to the capacity of the road and its effects.

(2) By monitoring the vehicle speed and cross referencing that with highly-detailed on-board mapping software and the vehicle location from GPS coordinates, the system can track whether the vehicle is behaving in accordance with locations where proper signage is expected to be displayed. Patterns of violation indicate that signage may be missing, unreadable and/or being ignored.

(3) By monitoring the vehicle speed and cross referencing that with highly-detailed on-board mapping software, the system can determine if the vehicle has been traveling above the posted speed limit and provide statistical data to the safety of the road and whether speed zones need to be reduced or evaluated.

GPS and communication equipped handheld or mobile computer: A handheld system such as HP IPAQ or other device with either built in or added GPS and wireless communication systems and storage for spatial and relational data (such as maps, management data, schedules, appointments) to provide added interface between the vehicle computational Subsystem, Central Facilities and driver(s), passenger(s) and vehicles.

Combination of vehicle systems (e.g., engine, ABS, airbag): Allows the system collect data on the performance of any component within the vehicle system and store that performance data for analysis by OEMs.

The following is one illustration of the above system operation.

Continuing with the above example, as soon as the first vehicle ABS system is activated on the last curvy roadway, the telematics system received the notification that the anti-lock brake system had activated. At the same time that the call center software was notifying the advisory service of the road condition incident, it also sent a page to the local City/County/State maintenance department person that is listed with the advisory service as being responsible for that roadway. An email was sent earlier to the identified office or handheld computer of the responsible party but since no receipt was received indicating acknowledgment, in this case, a page was also sent. The responsible party then checks the page and a receipt is sent back to the advisory service and a work order numbered 100 is generated by the central facility to evaluate slippery conditions at the location of the incident. The responsible party drives to the location and the handheld computer that they are carrying (either by communicating with the vehicle, through its own GPS and spatial database or both) confirms that the vehicle and driver has entered the buffer zone for work order 100. Driver confirms work on work order number 100 and the Computational subsystem then calculates the time the dispatched driver(s), confirmed passenger(s) and vehicle(s) have been at the scene evaluating work order 100 validity. If the recorded personnel and equipment that were dispatched are so equipped, corrective action is applied. Then the Computational Subsystem prompts the driver(s), passenger(s) and vehicles regarding work order 100 once it is determined that they have left the location as defined by the spatial buffer zone. Depending on the work performed the Computational Subsystem upgrades work order 100 status from open to closed via corrective action of salting the pavement (or other type of message) or if work order 100 is not addressed or corrected work order 100 status remains open and continues to record the time, materials, activity, costs and other actions of the driver(s), passenger(s) and vehicles that come and go within the work order 100 buffer zone until it is closed. Information on work order 100 becomes available for further uses.

Another set of operational features may facilitate the following functionalities: drivers can receive on-demand updates with more and detail reports of road conditions, and City/County/State/federal customers can receive detailed updates of road conditions including rutting, blow-ups, potholes and distress measurements. Several individual vehicle components are discussed below.

Inertial Measurement Unit (IMU): Allows the system to directly determine that a vehicle has encountered a road condition of a certain condition. Providing pitch and yaw measurements, the IMU can determine surface anomalies such as lane ruts, concrete lane blow-ups, and severely potholed and patched surfaces. This feature coupled with GPS coordinates and intelligent mapping software will allow the determination of road surface conditions and send a notification to the street department to warn of the condition for inspection and/or corrective action.

The following is one illustration of the above system operation.

Continuing with the above example, the second driver checked the conditions on an alternative route through the telematics service and decided to take an alternative route around the icy conditions on the curvy road initially traveling on. The second driver has been driving for a while now and hits the telematics service button or activates it with voice commands to get the latest road conditions ahead on the new road the second driver is now traveling on. A third driver who is driving ahead of the second driver on this new road also has a telematics system. The third driver system was able to gauge the road conditions, due to an installed inertial motion sensor (IMU). The third vehicle sensors detected deteriorated road condition and has now stopped completely due to Road Construction Ahead. Driver three has been sitting there for one hour and is just starting to move at regular speeds. The answer the second driver received back from the telematics system relayed to it by the third driver was not good. It describes poor road surface and a one hour delay in traffic. Driver two, not having another option, continued on. Later, as the road got rougher, the second driver received information that the traction control system was not working properly. This information was then sent to the call center. The call center determined that this system was under recall for the specified make and year of vehicle and then checked the appointment calendar of the third vehicle and the home dealership (or if secondary option of find closes dealership is checked by subscriber this dealership is located and schedule checked) and an appointment is scheduled to make the appropriate repairs and all parties notified.

Another set of operational features may facilitate the following functionalities: participating drivers can receive on-demand updates of even more detailed reports of road conditions including identification of lane restrictions, lane impediments, and lane-by lane mapping data; and City/County/State/federal and other interested customers can receive more detailed updates of road conditions including lane-specific surface anomalies and obstructions for capacity issues. Several individual vehicle components are discussed below.

Enhanced Inertial Measurement Unit (IMU): Allows the system to directly determine that a vehicle has encountered a road condition of a certain condition with greater accuracy compared to previous generation IMUs. This feature coupled with a more sensitive vehicle positioning system coordinates and more intelligent mapping software will allow the determination of road surface conditions with a greater degree of reliability and accuracy and send a notification to the street department to warn of the condition for inspection and/or corrective action.

Enhanced Vehicle Positioning System: Allows the system to directly determine a vehicle's position. This positioning system will drive many other aspects of the overall system to greater accuracy and data reliability.

Software Staging Area: Allows the deployment of software to vehicle for updating system and vehicle operation and features.

The following is one illustration of the above system operation.

A police officer is pursuing another vehicle at high speed along an expressway. The fleeing vehicle identifies a stalled vehicle in the middle lane up ahead, and plans to drive directly towards the obstacle, veering away at the last moment but expecting the trailing police vehicle to not be able to avoid the obstacle. However, the police vehicle has received information from other telematics subscribers indicating the presence of an upcoming middle lane obstacle since several vehicles have uploaded data to the central facility showing swerving maneuvers at approximately the same point. The police vehicle was able to continue the pursuit and over take the fleeing vehicle by moving to another lane and avoiding the impending crash with the stalled vehicle.

The police vehicle then tries to use the installed automatic nail strip ejector that ejects a strip of nails from the rear bumper. However, the software, which controlled the ejector, was not working. The call center was notified of the bug and was also contacting the vehicle manufacturer to determine the exact nature of the error. It was confirmed that a software error was present and new software that the call center received from the OEM was automatically downloaded to the police vehicle, enabling the ejector to deploy in timely and effective manner.

Moreover, the system disclosed herein may be used to address the following important areas of driver experience, safety, and behavior: rear-end collision avoidance; lane change and merge collision avoidance; road departure collision avoidance; intersection collision avoidance; vision enhancement; vehicle stability; driver condition warning; and safety impacting services.

To facilitate improvements in these areas, various standard sensors and systems are normally deployed within vehicles, which likewise may be used to practice the invention. For example, the sensors may acquire the following measurements: in-lane lateral position; relative heading angle; velocity; longitudinal acceleration; lateral acceleration; yaw rate; steering wheel angle; road condition; lane width; shoulder width; longitude and latitude using Differential Global Positioning System (DGPS); outside vehicle and other obstruction proximity detectors; visual lane departure detectors; roadway type; pavement markings; road-edge incursions; and lane change status.

Clearly, the transportation information system and method disclosed herein is capable of supplying meaningful information at the appropriate times, namely, when specified events occur. This information will dramatically improve the condition, capacity, safety and security of the roadways for the traveling public and improve the operation and efficiency of responsible agencies.

In particular, sensing devices are used to collect this data to provide a wealth of data that can be transformed into meaningful roadway pavement design, condition, capacity, safety and liability information in real-time. Real-time vehicle performance information can also be collected and mined for OEMs to improve future vehicle performance.

For example, with the use of interpretive vehicle-based and back-end software and systems, real-time data on internal vehicle systems, positional systems such as DGPS, inertial and other sensors can be used to record vehicle vertical and lateral movements, acceleration, and deceleration. This information can be translated to information on rutting, potholes, roughness of ride, cross slope, friction numbers (skid resistance), fatigue cracking and other surface anomalies. The client vehicle systems (i.e., on-board vehicle systems) will interpret and authenticate data, and then utilize the vehicle communication architecture to distribute the information to the back-end systems (i.e., central facility) to further model, analyze, quantify and prioritize this information for further real-time distribution to the individual user groups and telematics customers.

A beneficial feature of the system concerns utilization of the automobile, trucks, buses and other vehicles and equipment as a source of data that can be retrieved to provide information in context sensitive ways. This transportation information system combines sensing, computing, location technology and wireless data in vehicles. Usual Telematics includes in-vehicle applications such as navigation and traffic-information systems, collision avoidance systems and mobile communications gear.

This transportation information system enables a vehicle to be used for the passive collection of roadway infrastructure data and other data without distracting the driver. This transportation information system and method avoids any concern over creating distractions from cell phone usage, since data will be collected automatically and without driver intervention as the vehicle travels down the roadway.

Typical problems from roadway deficiencies include poor roadway or intersection alignment or improper signage and pavement marking. These problems are typically uncovered only from the discrete input from individual drivers, and perhaps corrected only when citizen complaints begin to mount concerning driving over median dividers at confusing intersections or going down the wrong way on a poorly signed one way street.

However, the invention alleviates these concerns, for example, by detecting missing speed limit signs, stop signs, traffic buildup, sudden capacity issues, and icy conditions, by correlating the GPS coordinates with the vehicle speed and information.

For example, vehicle movement is correlated to data attributes (known or derived from the on-board system) in the digital map database, such as direction of travel, to determine potential violations such as going the wrong way on a one-way street.

Possible responses by the system include warning of individual drivers, and correlation of driver patterns to alert those responsible for maintenance of poor intersection design or signage. Additionally, the system may provide information to drivers or government agency staff regarding upcoming curves and current safe speeds based on performance of previous drivers under the current weather conditions or regarding curves where oncoming vehicles tend to cut the corner.

Moreover, vehicle movement that is correlated to data attributes (known or derived from the on-board system) in the digital map database, such as intersection type, to determine potential violations such as going through a controlled intersection.

Possible responses or actions by the system include warning of individual drivers (i.e., approaching or in the proximity of that intersection), or correlation of driver patterns to alert those responsible for maintenance of poor or missing intersection signage. Additionally, the system may monitor vehicle movement in the driving direction compared with wheel rotation and antilock breaking action to determine hydroplaning if it is summer or icy conditions in the winter.

Additional responses include warning of individual drivers, (i.e., approaching that intersection), correlation of driver patterns to alert those responsible for maintenance of unsafe conditions requiring short-term corrective action (i.e., sanding or salting the roadway), or long-term corrective action (i.e., resurfacing the roadway).

Downed or missing signs will not remain undetected as conventionally occurs. Now, the first car that does not stop at a formally controlled intersection will send an alert to the system models. If the rest of the subscriber vehicles stop as they should, then that vehicle was just a careless driver. If on the other hand each of the next few cars does not stop, then this will violate the rules that were created for that intersection and other subscribing drivers in that area will be warned of a dangerous intersection and instructed to proceed with caution. In addition to notifying subscribing drivers, this information is e-mailed to the subscribing agency and crews are dispatched to the intersection in question.

Significant advantages accrue in the invention as it relates to adequate use of traffic-related event data. With the invention, the large number of telematics equipped vehicles on the road will enable the development of specific system wide-traffic information.

The specific and real-time data could be developed and sent directly to subscribing motorists that are approaching a congested area. Low cost two-way limited communication already exists in the vehicle today. The control channel may be used for call set up and to register handsets for two-way data messaging. Current satellite technology from companies like Orbcomm also may be used. Satellite digital audio radio, such as XM and Sirius, are also feasible. These technologies could bring selective listening to the vehicles so that information such as a traffic update that is not pertinent to one vehicle does not hear it while another vehicle that is interested does. The motorists will finally have directly relevant information and real informed options based on the information that they chose to receive. Travelers will now know the length of expected delay and the turn by turn direction and exact length of possible alternate routes well before they get to the congested area.

Discrete traffic data will also be collected to assist with the roadway structural and capacity design. Roadways are initially designed using current traffic volume and load data that is then predicted to increase over the life of the roadway. The design of the traffic lights and signs involve the use of modeling software to predict how traffic will flow under various predicted conditions. Many times these predictions are insufficient to properly design roads that best serve the traveling public.

The transportation information system will be able to warn specific subscribers of traffic problems on their intended route and alert responsible agencies of capacity related problems. This information will come from known sources or the discrete information from subscribers who are already experiencing the modification to their driving patterns. Although the first drivers to the scene may not be able to take advantage of the specific traffic information that they generated, they will be helping other subscribers avoid the problem. Further, if these subscribers begin to look for alternative routes, they may be able to send successful alternate routes to other interested driers.

The system addresses other concerns as well.

For example, vehicle movement will be correlated to data attributes (known or derived from the system) in the digital map database, such as construction information, work zones, traffic jams, and discrete obstructions, to normal travel to warn drivers of situations and provide alternatives for travel.

Possible actions by the system include requests for posting at construction sites to make announcement to individual drivers approaching the area, and, if an ultimate destination is known, providing best alternate routes from route planning software and/or new route information from other detoured drivers. Other actions include requests for posting of traffic jams to announce to individual drivers approaching the area, and, if an ultimate destination is known, providing alternate routes. If traffic jams are not known, then information from driver patterns in the area would be used to provide information to later drivers approaching the area.

Other actions include discrete monitoring of interruptions to normal traffic flow, but analyzed in aggregate to determine the location of the possible obstruction to traffic. For example, monitored data may include a number of vehicle movement anomalies, speed changes, braking activity, and inertial measured movement including relative lane changes to and from the original lane at approximately the same location along roadway. This could be the result of a dead animal, vehicle debris or a large pothole. Based on the analysis of the discrete data this information could be provided to those responsible for roadway maintenance.

There may be further monitoring of traffic data to determine over or under designed roadway capacity. One possible system response would include alerting those responsible for traffic designs of capacity issues requiring short-term corrective action (i.e., traffic Police) or long-term corrective action (i.e., turning lanes added to intersections).

Another system feature involves the correlation of vehicle speed and braking along with the inertial sensed movement of vehicles, in order to determine surface undulation such as heaved pavement due to buckling form heat, upheavals from frost or depressions from sinkholes. Possible system action includes warning of individual drivers, (i.e., approaching that surface problem), correlation of driver patterns to alert those responsible for maintenance of unsafe conditions requiring short-term corrective action (i.e., ramping the area), or long-term corrective action (i.e., reconstructing the roadway).

The system may also collect the following driver information: vehicle positional information and braking activity. As a vehicle moves through the traffic, the system will determine the rate at which the driver is progressing. Possible driver feedback values include arrival, departure information and duration of delay updates to individual drivers, (i.e., "you will be on your way in 6 minutes" or "expect delay of 90 minutes advised to take upcoming alternate route which you will reach in 10 minutes"). Other collected information may include vehicle braking along vertical movement, pitch and role and tire pressure readings. These may be used to determine vehicle contact with potholes and other pavement irregularities. The system will record events for dissemination to those that repair the road as well as repair the vehicle.

The system will also be able to track the effect of traffic control devices such as stop signs on the traveling public. Anomalies such as changes in vehicles' behavior at intersections can be tracked to determine the presence or absence of signs. For example, if all vehicles stopped at the intersection in question on the day of an accident, this would strongly indicate that a stop sign was standing at that intersection at the time of the accident.

Regarding the use of the system for issue advocacy purposes as it relates to issuing notifications to governmental bodies, the system supports an automated data collection and notification system. The information derived from a passive, non-intrusive roadway design, capacity, safety, security and condition data collection system will greatly assist with this notification purpose. This real-time information can be uniquely communicated directly and quickly via email or wireless to agencies and legislatures as the driver experiences it.

The advantages of the invention are various.

Road condition, traffic, hazard, and vehicle data will be collected using public or fleet vehicles and provided in real-time to city, county, state and private agencies and even back to the drivers themselves. Government and private agencies will use this information to more effectively manage their infrastructure planning, design, maintenance, and information dissemination to the traveling public.

Regarding surface distress on roadways, the existing on-board ride stabilization system sensors on the vehicle detect those same movements and transmit that data to a processing center, where it is interpreted into roadway condition, priorities and corrective action information. Automatically this information is communicated to the responsible government agency for general operation use and, if critical to traffic flow, in a short time the roadway is repaired.

In a widely deployed system, a user will be informed of the exact minute delay of the traffic jam the user is approaching based on the progress of other vehicles ahead of the user.

Public safety officials will be able to watch a real-time display of the actual traffic conditions everywhere in their geographical area and immediately react to trouble spots.

The driving pattern change of several city vehicles is picked up at an intersection and sent back to the sign crews. The change from a stop and go reading to a through intersection makes a once controlled intersection a potential accident waiting to happen since the stop sign is missing. Detection of this event enables correction action to be applied.

The system could offer the traveling public and vehicle OEMs various services. For example, the traveling public could receive the most complete real-time driving management information to date. Vehicle OEMs will receive design, maintenance, and performance information. The public could receive travel information through subscribing radio traffic reporting stations or directly as telematics subscriber of the system, and the OEMs through the mining of the data.

The system architecture will enable retrofit applications in the military market, where implementations can be provided to develop real-time systems to track, manage, command, supply and retract units on the ground, air and sea.

The following describes the usefulness of further vehicle sensor information.

Data from the IMU or transmission may be used to calculate the grade/slope of the road and the road crown. Road crown becomes particularly important when surface conditions are slick, as this directly affects safety considerations and would thereby pertain to a safety-related event category. The information can also be used to advise maintenance crews regarding the appropriate work program, namely, whether to overlay a road or perform a mill and then a new overlay.

Brake-related data may be acquired reflecting activation patterns of the antilock brakes or merely just hard or irregular braking. For example, heavy braking followed by swerve or depression detects pothole or roadway object.

Data from load leveling systems may indicate conditions such as roughness and general anomalies to normal ride, e.g., hitting a pothole and going over a curb. For example, depression action triggers a pothole pattern.

Data from headlights and fog lights provide indications of visibility levels.

Data from tire pressure gauges can provide a measure of the extent of tire contact with the roadway surface.

Data concerning blinker usage denotes an upcoming turn or lane change depending on speed.

The transmission state or mode may indicate different scenarios for the vehicle. For example, if the transmission data indicates that the vehicle is parked/stopped on a freeway, this could reflect the occurrence of events such as long traffic delays versus just a normal congested roadway. A reverse transmission state occurring at an intersection means that the driver made a mistake and needs to correct it. As a verifying cross-check of such a serious situation, other relevant system sensors could be polled to confirm this interpretation of driver action.

Data from the vehicle outside temperature gauge may provide specific temperature readings at current vehicle location. For example, if antilock brakes activate, the system could check the outside temperature to see if freezing is a factor. Additionally, as an advance warning to other drivers, the system could commence sending temperature information as the readings start to approach critical temperatures like 32 degrees for normal water freezing or a lower temperature if antifreeze agents have been applied.

The status of the heater controls may be useful as well. For example, if a defrost selection is activated, then the system could send a meteorological messages based on the state of heater controls.

Data indicative of the engine state and other engine systems (e.g., fuel, oil pressure, temperature, transmission, or other system indicators) can be used to determine events or conditions like overheating potential and running out of gas (e.g., calculated based on miles driven per hour projected over time versus average amount of fuel in gas tank). An evaluation of other suitable system indicators may be relevant to identifying the possibility of vehicle stalling.

Data may also be obtained from suitable engine systems to calculate emissions data, which may be used by agencies to monitor air quality on roadways. For example, interested parties could compare the emission of the vehicle for air quality per miles traveled from cars that are in a congested situation on a freeway to cars that have free flow on a freeway. Optionally, it may be feasible to install a carbon monoxide detector on the vehicle at its external surface to determine CO readings.

Other sensor units may relate to traction control, load leveling, ride stabilization, and automatic brake systems, such as what exists currently in vehicles as standard equipment.

Laser sensors may also be deployed on vehicles (e.g., autos and trucks) for the following applications.
1. Measure the pavement surface for various types of cracking and other anomalies.
2. Calculate the distance from a certain point on the vehicle to the ground, for use with other systems (e.g., load leveling).

The calibrated measurements from the vehicle could determine the axle weight of the vehicle for:
1. Overweight vehicles that could be checked against weight-restricted roads to:
   1. Warn the driver of an overweight condition for the current road or if the truck is currently headed for a weight restricted road. This feature may be supplemented with scanning other engine systems (load leveling) to see if non-standard shocks or springs have been substituted on the vehicle to avoid this detection.
   2. As detection for enforcement
2. Monitor weight of vehicles such as:
   1. Dump trucks, cement trucks, crew vehicles or other vehicles used to haul material, equipment, people, resources to and from job sites in an effort to measure and monitor how much material, people, equipment were applied, used, worked on a jobsite for tracking and reporting.
   2. Could be used in conjunction with PDA for confirming the calculations of the vehicle system.
   3. Could be used in conjunction with Global Positioning System (GPS) including Differentially corrected signals and Geographic Information System (GIS) to detect what job site is involved and movement from or to jobsite.

The following describes further possible applications that may be implemented with practice of the invention.

Regarding roadway design, the system may be used to monitor the heading and directionality of the vehicle in relation to known and lawful traffic patterns. For example, the monitored data may indicate if the vehicle is going the wrong way on a one-way street, which may be further indicative of poor signage. A warning may be issued to the driver and responsible traffic control agency in response to this scenario.

Regarding traffic condition, data may be collected to determine average fuel economy for cars and render interpretations as to the efficiency of the vehicle consumption. For example, poor fuel economy may indicate stop-and-go travel patterns consistent with traffic jams and congestion. The EPA and vehicle manufacturers can mine this traffic data for use.

Further areas for providing condition-type event data include information pertinent to surface condition, operational aspects, safety concerns, and security features.

For example, regarding elevation-type data, the car sensors may be used to determine elevation-related distresses on the road. These distresses occur on both asphalt and concrete. The data may provide indications of the following events: ride (overall condition of the entire road); roughness (texture of the road, used for short patches of the road); potholes (depressions); blowups (concrete explosions); rutting; longitudinal cracking (cracks that run lengthwise on the road); and transverse cracking (working joint, fills with debris).

Regarding operational events, data may be acquired and forwarded to the main office (via central facility) for processing. The system then automatically creates a work order that then gets sent to a maintenance truck that is responsible for handling the action. The time is automatically tracked to the work order, the dispatching, and the warning of the crew when they are close, for example.

Regarding safety issues, purported safety events may be detected merely by proper interpretation of data; for example, slippage may be determined, although the conditions may be "ideal" (e.g., sunny day, dry). Accordingly, if slippage occurs, other sources of difficulty are investigated, such as whether there is a problem with the roadway design or the vehicle (e.g., the tires may not be properly inflated or sized to the vehicle).

Further notable aspects of the invention including the following. The data center (central management facility) serves as a real-time transportation database that takes all the readings from all the vehicles, stores them, and endeavors to apply the detected events to other user situations and scenarios in a meaningful, effective, and useful manner. For example, certain applications for operations and safety could receive event data from the transportation database and use it for decision support and dispatch.

In one form, the system may be considered to be downloadable and configurable on the fly. The system may be configured so that it can turn its data collection on and off. For example, the system may create a boundary area or region that is defined for system activation, so that if the vehicle enters the region, data collection is commenced or resumed, thereby making the system configurable in real-time.

In overview, the system may generally be considered to involve a protocol involving the detection of vehicle travel, processing of data, pattern matching (e.g., comparison to reference data to determine if event occurred), decision-making (whether event has indeed occurred), and storage. Once the pattern is identified, then the follow-on steps occur to get more data. The final processing of the data to determine whether a distress occurred or not may actually occur off-line. The in-vehicle box is responsible for detecting certain events which trigger additional data collection and processing. From there, that data can then be shipped to the point where the interpretation is made and a decision is made.

A few exemplary condition scenarios include leaving from stop sign (e.g., slippage, so record a slippery event), and approaching a stop sign (e.g., skidding, so record a slippery event).

Advantageous features of the invention includes the collection of condition data and use of such data; the collection of safety data and use of such data; the collection of operational data; and the collection of capacity data and use of such data.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In an environment where a plurality of in-use vehicles each defining a respective vehicle environment are traveling in a roadway network, a method for use in association with a user vehicle from said plurality of vehicles, said method comprising the steps of:

the user vehicle environment collecting data generated within the user vehicle environment;

the user vehicle environment processing the collected data to determine the occurrence of at least one event;

the user vehicle environment generating at least one event indicator upon determination of event occurrence;

causing the communication of information including the at least one event indicator from the user vehicle environment to at least one other vehicle, said causing step further includes the steps of:

identifying any vehicle satisfying a relevance criteria in connection with the at least one event indicator; and facilitating communication of the information including the at least one event indicator from the user vehicle environment to at least said one identified vehicle, said information being indicative of rerouting.

2. The method as recited in claim 1, wherein the identifying step further includes the step of: comparing a location indicator of the user vehicle correlated to the at least one event indicator to data indicating a current or expected travel route or to information indicative of a travel itinerary for a respective vehicle.

3. The method as recited in claim 1, wherein the relevance criteria employed in the identifying step involves determining a correlation between a location indicator of the user vehicle associated with the at least one event indicator and data indicating a current or expected travel route for a respective vehicle.

4. The method as recited in claim 1, further includes the step of: for at least one vehicle identified as satisfying the relevance criteria, the at least one identified vehicle generating navigational information being indicative of rerouting based on the communication received from the user vehicle environment.

5. The method as recited in claim 1, wherein the communication of information from the user vehicle environment to at least one other vehicle further includes information relating to at least one of: (i) user vehicle operation, (ii) user vehicle behavior, (iii) roadway condition, (iv) roadway travel safety, (v) roadway capacity, and (vi) traffic condition.

6. The method as recited in claim 1, wherein the communication of information from the user vehicle environment to at least one other vehicle includes a location indicator of the user vehicle correlated to the at least one event indicator.

7. The method as recited in claim 1, in regard to any respective vehicle receiving the communication from the user vehicle environment, further includes the step of: the recipient vehicle environment processing the received communication to determine relevance of the at least one event indicator to ongoing travel of the recipient vehicle.

8. The method as recited in claim 7, further includes the step of: the recipient vehicle environment generating navigational information, in response to an affirmative relevance determination.

9. The method as recited in claim 1, wherein the collected data relating to at least one of: (i) vehicle performance, (ii) vehicle operation, (iii) vehicle behavior, (iv) roadway condition, (v) roadway travel safety, (vi) roadway capacity, (vii) roadway design, (viii) traffic condition, and (ix) traffic control feature.

10. The method as recited in claim 9, wherein the occurrence of an event signifying at least one of: (i) abnormal or substandard vehicle performance, (ii) abnormal or substandard vehicle operation, (iii) abnormal or substandard vehicle behavior, (iv) abnormal or substandard roadway condition, (v) risk to roadway travel safety, (vi) roadway capacity exceeding acceptable levels, (vii) deficient roadway design, (viii) traffic condition exceeding acceptable levels, and (ix) inadequate, malfunctioning or missing traffic control feature.

11. The method as recited in claim 1, wherein the processing step further includes the steps of: providing predetermined reference data; comparing the collected data to the reference data; and determining whether at least one event has occurred, using the data comparison.

12. The method as recited in claim 11, wherein the providing step further includes the step of: storing the predetermined reference data in the user vehicle environment.

13. The method as recited in claim 11, wherein the reference data includes geospatial roadway information.

14. The method as recited in claim 11, wherein the reference data includes roadway feature information and corresponding location information.

15. The method as recited in claim 1, further includes the step of: the vehicle environment associating a location indicator of the vehicle to the at least one event indicator, the association forming part of the communication.

16. A system for use in an environment where a plurality of in-use vehicles each defining a respective vehicle environment are traveling in a roadway network, said system comprising:

a facility;

at least one vehicle environment including a respective vehicle on-board system comprising:

a data system, the data system being operably configured to collect data generated within the respective vehicle environment, a processor, the processor being operably configured to process the data to determine the occurrence of at least one event, the processor being operably configured further to generate at least one event indicator upon a determination of event occurrence;

a communication unit, the communication unit being operatively coupled to at least one of the data system and the processor, the communication unit being operably configured to send a communication to the facility including the at least one event indicator; and a means to generate navigational information, in response to a communication received from said facility including information indicative of rerouting;

said facility being operably configured (i) to process any communication received from a respective vehicle environment to determine whether the received communication contains information having relevance to any other vehicle, and (ii) to communicate information to any vehicle associated with the relevance determination, the facility communication including information indicative of the at least one event indicator associated with the received vehicle communication.

17. The system as recited in claim 16, wherein the facility further includes: a means to compare location information pertaining to the respective vehicle associated with a received vehicle communication to data indicative of a current or expected travel route for at least one other vehicle.

18. The system as recited in claim 16, wherein the facility further includes: a means to determine a correlation between location information pertaining to the respective vehicle associated with a received vehicle communication and data indicative of a current or expected travel route for at least one other vehicle.

19. The system as recited in claim 16, wherein the communication of information from the vehicle environment to said facility includes information relating to at least one of: (i) user vehicle operation, (ii) user vehicle behavior, (iii) roadway condition, (iv) roadway travel safety, (v) roadway capacity, and (vi) traffic condition.

20. The system as recited in claim 16, wherein the data system further includes: a sensor assembly.

21. The system as recited in claim 16, wherein the data system being operably configured further to collect data from at least one communication bus of the vehicle environment.

22. The system as recited in claim 16, wherein the data system being operably configured further to collect data from standard vehicle equipment.

23. The system as recited in claim 16, wherein the vehicle on-board system further includes: a module, the module being operably configured to associate a location indicator of the vehicle to at least one of the collected data and the processing results.

24. The system as recited in claim 16, wherein the vehicle on-board system further includes: a data storage, the data storage containing predetermined reference data.

25. The system as recited in claim 24, wherein the processor being operably configured further (i) to compare the collected data to the reference data, and (ii) to determine whether at least one event has occurred, using the data comparison.

26. The system as recited in claim 24, wherein the reference data includes geospatial roadway information.

27. The system as recited in claim 24, wherein the reference data includes roadway feature information and corresponding location information.

28. The system as recited in claim 16, wherein the vehicle on-board system further includes: a means to render the processing results into a form perceptible to an occupant of the vehicle environment.

29. The system as recited in claim 28, wherein the rendering means further includes a display.

30. A method for use in an environment where a plurality of vehicles are traveling in a roadway network, each vehicle defining a respective vehicle environment, said method comprising the steps of:
at least one vehicle environment collecting data generated within the respective vehicle environment, the at least one vehicle environment respectively processing the respective collected data to determine the occurrence of at least one event; the at least one vehicle environment respectively generating at least one respective event indicator upon a determination of event occurrence;
processing the at least one event indicator generated by the at least one vehicle environment to determine relevance of the at least one event indicator to maintenance of the roadway network and rerouting of the vehicle;
identifying each event indicator associated with a respective determination of relevance;
causing the transmittal of a communication to an appropriate roadway maintenance entity or responsible transportation authority in reference to at least one identified event indicator, the communication including information indicative of the respective identified event indicator and a location indicator of the vehicle environment associated therewith; and
formulating a maintenance work program in reference to a portion of the roadway network associated with the location indicator of the vehicle environment associated with a respective identified event indicator.

31. The method as recited in claim 30, further includes the step of: causing the dispatch of a maintenance crew to a portion of the roadway network associated with the location indicator of the vehicle environment associated with a respective identified event indicator.

32. The method as recited in claim 30, further includes the step of: issuing a communication including information indicative of a respective event indicator determined to be relevant and a location indicator for the respective vehicle environment associated therewith, the communication issuing to an appropriate roadway maintenance entity or responsible transportation authority.

33. The method as recited in claim 30, wherein the collected data relating to at least one of: (i) vehicle performance, (ii) vehicle operation, (iii) vehicle behavior, (iv) roadway condition, (v) roadway travel safety, (vi) roadway capacity, (vii) roadway design, (viii) traffic condition, and (ix) traffic control feature.

34. The method as recited in claim 33, wherein the occurrence of an event signifying at least one of: (i) abnormal or substandard vehicle performance, (ii) abnormal or substandard vehicle operation, (iii) abnormal or substandard vehicle behavior, (iv) abnormal or substandard roadway condition, (v) risk to roadway travel safety, (vi) roadway capacity exceeding acceptable levels, (vii) deficient roadway design, (viii) traffic condition exceeding acceptable levels, and (ix) inadequate, malfunctioning or missing traffic control feature.

35. The method as recited in claim 30, wherein the relevance determination made by the processing step in respect of a respective event indicator being formulated to ascertain whether the respective event indicator being indicative of the need for maintenance to be performed to the roadway network.

36. A system for use in an environment where a plurality of in-use vehicles each defining a respective vehicle environment are traveling in a roadway network, said system comprising:
first means for collecting data generated within at least one vehicle environment; and
second means for processing the collected data to determine the occurrence and location of at least one event relevant to at least one maintainable feature of the roadway network and create a maintenance work program formulated in response to said event and location.

37. The system as recited in claim 36, wherein said second means further includes:
means for respectively generating at least one respective event indicator upon a respective determination of event occurrence.

38. The system as recited in claim 37, further includes: means for causing the transmittal of a communication to an appropriate roadway maintenance entity or responsible transportation authority in reference to at least one respective event indicator, the communication including information indicative of the respective event indicator and a location indicator of the vehicle environment associated therewith.

39. The system as recited in claim 36, wherein the relevance determination performed by said second means in reference to a respective event being formulated to determine whether the respective event is indicative of the need for maintenance to be performed to the roadway network.

40. A system for use in an environment where a plurality of in-use vehicles each defining a respective vehicle environment are traveling in a roadway network, said system comprising:
a facility;
at least one vehicle environment including a respective vehicle on-board system comprising:
a data system, the data system being operably configured to collect data generated within the respective vehicle environment,
a processor, the processor being operably configured to process the data to determine the occurrence of at least one event, the processor being operably configured further to generate at least one event indicator upon a determination of event occurrence, and
a communication unit, the communication unit being operatively coupled to at least one of the data system and the processor, the communication unit being operably configured to send a communication to the facility including the at least one event indicator;

said facility being operably configured (i) to process any communication received from a respective vehicle environment to determine whether the received communication contains information having relevance to roadway maintenance, and (ii) to communicate information to an appropriate roadway maintenance entity or responsible transportation authority in reference to a processed communication determined to be relevant, the facility communication including information indicative of the at least one event indicator associated with the relevant received vehicle communication and potential rerouting of roadway network.

41. The system as recited in claim 40, wherein the vehicle on-board system further includes: a module, the module being operably configured to associate a location indicator of the vehicle to at least one of the collected data and the processing results.

42. A method for use in association with a vehicle traveling on a roadway, the vehicle defining an environment, said method comprising the steps of:
the vehicle environment collecting data generated within the vehicle environment and from other vehicle environments; and
the vehicle environment processing the collected data to determine the occurrence of at least one event and generate navigational information indicative of rerouting, wherein the processing step further includes the steps of: providing predetermined reference data; comparing the collected data to the reference data; and determining whether at least one event has occurred using the data comparison and wherein the reference data includes roadway feature information and corresponding location information.

43. The method as recited in claim 42, wherein the collected data relating to at least one of: (i) vehicle performance, (ii) vehicle operation, (iii) vehicle behavior, (iv) roadway condition, (v) roadway travel safety, (vi) roadway capacity, (vii) roadway design, (viii) traffic condition, and (ix) traffic control feature.

44. The method as recited in claim 42, wherein the occurrence of an event signifying a data value falling outside an allowable level or range.

45. The method as recited in claim 44, wherein the occurrence of an event signifying at least one of: (i) abnormal or substandard vehicle performance, (ii) abnormal or substandard vehicle operation, (iii) abnormal or substandard vehicle behavior, (iv) abnormal or substandard roadway condition, (v) risk to roadway travel safety, (vi) roadway capacity exceeding acceptable levels, (vii) deficient roadway design, (viii) traffic condition exceeding acceptable levels, and (ix) inadequate, malfunctioning or missing traffic control feature.

46. The method as recited in claim 42, wherein the providing step further includes the step of: storing the predetermined reference data in the vehicle environment.

47. The method as recited in claim 42, wherein the reference data includes geospatial roadway information.

48. The method as recited in claim 42, further includes the step of:
the vehicle environment associating a location indicator of the vehicle to at least one of the collected data and the processing results.

49. The method as recited in claim 48, further includes the step of: the vehicle environment communicating at least one of the collected data, the processing results, and the vehicle location indicator associated therewith to a location apart from the vehicle environment.

50. The method as recited in claim 48, further includes the step of: the vehicle environment communicating at least one of the collected data, the processing results, and the vehicle location indicator associated therewith to at least one other vehicle.

51. The method as recited in claim 42, further includes the step of:
communicating the processing results in perceptible form to an occupant of the vehicle environment.

52. The method as recited in claim 51, wherein the communicating step further includes the step of: displaying the processing results.

53. A vehicle on-board system for use with a vehicle, the vehicle defining an environment, said system comprising:
a data system, the data system being operably configured to collect data generated within the vehicle environment and from other vehicle environments;
a processor, the processor being operably configured to process the data to determine the occurrence of at least one event and generate navigation information indicative of rerouting; and
a data storage, the data storage containing predetermined reference data, wherein the reference data includes roadway feature information and corresponding location information.

54. The system as recited in claim 53, wherein the data system further includes: a sensor assembly.

55. The system as recited in claim 53, wherein the data system being operably configured further to collect data from at least one communication bus of the vehicle.

56. The system as recited in claim 53, wherein the data system being operably configured further to collect data from standard vehicle equipment.

57. The system as recited in claim 53, further includes: a module, the module being operably configured to associate a location indicator of the vehicle to at least one of the collected data and the processing results.

58. The system as recited in claim 57, further includes: a communication unit, the communication unit being operatively coupled to at least one of the data system, the processor, and the module.

59. The system as recited in claim 58, wherein the communication unit being operably configured to send a communication to a location apart from the vehicle environment, the communication including at least one of the collected data, the processing results, and the vehicle location indicator associated therewith.

60. The system as recited in claim 58, wherein the communication unit being operably configured to send a communication to at least one other vehicle, the communication including at least one of the collected data, the processing results, and the vehicle location indicator associated therewith.

61. The system as recited in claim 53, wherein the collected data relating to at least one of: (i) vehicle performance, (ii) vehicle operation, (iii) vehicle behavior, (iv) roadway condition, (v) roadway travel safety, (vi) roadway capacity, (vii) roadway design, (viii) traffic condition, and (ix) traffic control feature.

62. The system as recited in claim 53, wherein the processor having at least one functionality operably configured to determine the occurrence of at least one event signifying at least one of: (i) abnormal or substandard vehicle performance, (ii) abnormal or substandard vehicle operation, (iii) abnormal or substandard vehicle behavior, (iv) abnormal or substandard roadway condition, (v) risk to roadway travel safety, (vi) roadway capacity exceeding acceptable levels, (vii) deficient roadway design, (viii) traffic condition exceeding acceptable levels, and (ix) inadequate, malfunctioning or missing traffic control feature.

63. The system as recited in claim 53, wherein the processor being operably configured further (i) to compare the collected data to the reference data, and (ii) to determine whether at least one event has occurred, using the data comparison.

64. The system as recited in claim 53, wherein the reference data includes geo spatial roadway infrastructure information.

65. The system as recited in claim 53, further includes: a means to render the processing results into a form perceptible to an occupant of the vehicle environment.

66. The system as recited in claim 65, wherein the rendering means further includes a display.

67. A method for use in association with a plurality of vehicles each defining a respective environment, the plurality of vehicles traveling in a roadway environment, said method comprising the steps of:
a central facility operably receiving a respective communication from at least one vehicle environment, each respective vehicle communication comprising (i) at least one event indicator indicative of the occurrence of an event relating to the associated vehicle environment, and (ii) a location indicator indicative of the location of the vehicle;
the central facility processing a communication received from a respective vehicle environment and generating navigation information indicative of rerouting, wherein the processing step further includes, in respect of each received communication, the steps of:
determining whether the received communication contains information having relevance to any other vehicle; and communicating information to any vehicle associated with the relevance determination, the communicated information including information indicative of the at least one event indicator associated with the received vehicle communication, wherein the determining step further includes the step of: comparing the location indicator of the vehicle associated with the received communication to roadway travel information of another vehicle; and
identifying, based on the comparison results, any vehicle associated with a respective comparison result satisfying a specified criteria; and formulating, in respect of each identified vehicle, a rerouting plan for the identified vehicle, based on roadway travel information associated therewith and the location indicator of the vehicle associated with the respective received communication.

68. The method as recited in claim 67, wherein the processing step further includes the step of: determining a relevance of the vehicle communication to at least one user application.

69. The method as recited in claim 68, further includes the step of: issuing a communication to a user associated with an affirmative relevance determination.

70. The method as recited in claim 69, wherein the issued communication includes information indicative of the at least one event indicator associated with the respective relevant vehicle communication and the location indicator of the vehicle associated therewith.

71. The method as recited in claim 67, wherein the processing step further includes, in respect of each received communication, the step of: determining whether the received communication contains information having relevance to maintenance of the roadway environment.

72. The method as recited in claim 71, further includes the step of: communicating information to an appropriate roadway maintenance entity or responsible transportation authority associated with an affirmative relevance determination, the communicated information including information indicative of the at least one event indicator associated with the received vehicle communication and a location indicator of the vehicle environment associated therewith.

73. The method as recited in claim 67, wherein the processing step further includes, in respect of each received communication, the step of: determining whether the received communication contains information having relevance to at least one functionality of the respective vehicle environment associated therewith.

74. The method as recited in claim 67, wherein the processing step further includes, in respect of each received communication, the step of: determining whether the received communication contains information having relevance to at least one of traffic-related measure and roadway infrastructure.

75. A system for use in association with a plurality of vehicles each defining a respective environment, the plurality of vehicles traveling in a roadway environment, said system comprising:
a communication network; and
a central facility, said central facility being operably configured to enable communication with at least two vehicle environments via said communication network;
said central facility being operably configured to receive a respective communication from at least one vehicle environment, each respective vehicle communication comprising: (i) at least one event indicator indicative of the occurrence of an event relating to the associated vehicle environment, and (ii) a location indicator indicative of the location of the vehicle;
said central facility being operably configured to process a communication received from a respective vehicle environment and generating navigational information indicative of rerouting, wherein said central facility being operably configured further, in respect of each received communication, (i) to determine whether the received communication contains information having relevance to any other vehicle, and (ii) to communicate information to any vehicle associated with the relevance determination, the communicated information including information indicative of the at least one event indicator associated with the received vehicle communication, and wherein said central facility being operably configured further to compare the location indicator of the vehicle associated with the received communication to roadway travel information of another vehicle, and wherein said central facility being operably configured further (i) to identify, based on the comparison results, any vehicle associated with a respective comparison result satisfying a specified criteria, and (ii) to formulate, in respect of each identified vehicle, a rerouting plan for the identified vehicle, based on roadway travel information associated therewith and the location indicator of the vehicle associated with the respective received communication.

76. The system as recited in claim 75, wherein said central facility being operably configured further to determine a relevance of the vehicle communication to at least one user application.

77. The system as recited in claim 76, wherein said central facility being operably configured further to issue a communication to a user associated with an affirmative relevance determination.

78. The system as recited in claim 77, wherein the issued communication includes information indicative of the at least one event indicator associated with the respective relevant vehicle communication and the location indicator of the vehicle associated therewith.

79. The system as recited in claim 75, wherein said central facility being operably configured further, in respect of each received communication, to determine whether the received communication contains information having relevance to maintenance of the roadway environment.

80. The system as recited in claim 79, wherein said central facility being operably configured further to communicate information to an appropriate roadway maintenance entity or responsible transportation authority associated with an affirmative relevance determination, the communicated information including information indicative of the at least one event indicator associated with the received vehicle communication and a location indicator of the vehicle environment associated therewith.

81. The system as recited in claim 75, wherein said central facility being operably configured further, in respect of each received communication, to determine whether the received communication contains information having relevance to at least one functionality of the respective vehicle environment associated therewith.

82. The system as recited in claim 75, wherein said central facility being operably configured further, in respect of each received communication, to determine whether the received communication contains information having relevance to at least one of traffic-related measure and roadway infrastructure.

* * * * *